United States Patent [19]

Maulding

[11] Patent Number: 4,868,910
[45] Date of Patent: Sep. 19, 1989

[54] METAL DETECTOR WITH MICROPROCESSOR CONTROL AND ANALYSIS

[75] Inventor: Richard S. Maulding, Sweet Home, Oreg.

[73] Assignee: White's Electronics, Inc., Sweet Home, Oreg.

[21] Appl. No.: 156,616

[22] Filed: Feb. 16, 1988

[51] Int. Cl.⁴ .................. G01N 27/72; G01V 3/11
[52] U.S. Cl. .................... 324/233; 324/329; 324/326
[58] Field of Search ............... 324/329, 233, 239, 326

[56] References Cited

U.S. PATENT DOCUMENTS

| | | | |
|---|---|---|---|
| 3,559,041 | 1/1971 | Trigg. | |
| 3,852,659 | 12/1974 | Barringer. | |
| 3,950,695 | 4/1976 | Barringer. | |
| 4,086,527 | 4/1978 | Cadot. | |
| 4,099,116 | 7/1978 | Tyndall | 324/329 |
| 4,128,803 | 12/1978 | Payne. | |
| 4,230,987 | 10/1980 | Mordwinkin. | |
| 4,300,097 | 11/1981 | Turner | 324/329 |
| 4,325,027 | 4/1982 | Dykstra | 324/329 |
| 4,470,015 | 9/1984 | Hirschi | 324/329 |
| 4,486,713 | 12/1984 | Gifford | 324/329 |
| 4,517,550 | 5/1985 | Nakamura et al. | |
| 4,677,384 | 6/1987 | Payne | 324/329 |
| 4,709,213 | 11/1987 | Podhrasky | 324/329 |

FOREIGN PATENT DOCUMENTS

| | | | |
|---|---|---|---|
| 0480447 | 1/1952 | Canada | 324/329 |
| 0202353 | 10/1985 | Japan | 324/233 |

Primary Examiner—Reinhard J. Eisenzopf
Assistant Examiner—Jose M. Solis
Attorney, Agent, or Firm—Chernoff, Vilhauer, McClung & Stenzel

[57] ABSTRACT

A metal detector for use in locating objects such as coins includes analog and digital circuits, further combined with a microprocessor and stored program routines, to provide enhanced ground exclusion balance, target discrimination, and ease of use. Both discrimination and ground exclusion balance are under microprocessor control. A ground exclusion balancing routine is automated and can automatically track any changes in ground mineralization, changing the ground balance setting whenever required. A plurality of memory registers, each corresponding to a different range of phase angles, can be coded by the user to indicate whether a target producing a signal in that phase angel range is a desirable object. When a target response is detected, its characteristic phase angle is calculated. The memory register corresponding to the calculated phase angle is then checked. If the register contains an ACCEPT code, the metal detector signals the user that an accepted target has been found. The program of the microprocessor allows the user to program the metal detector to accept or reject a particular type of metallic item by passing the search head loop assembly over a sample item a few times, allowing the metal detector to determine and store in a memory register the sample's characteristic phase angle.

14 Claims, 22 Drawing Sheets

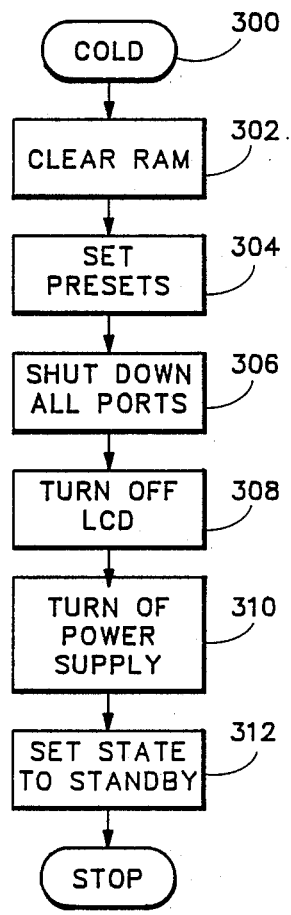
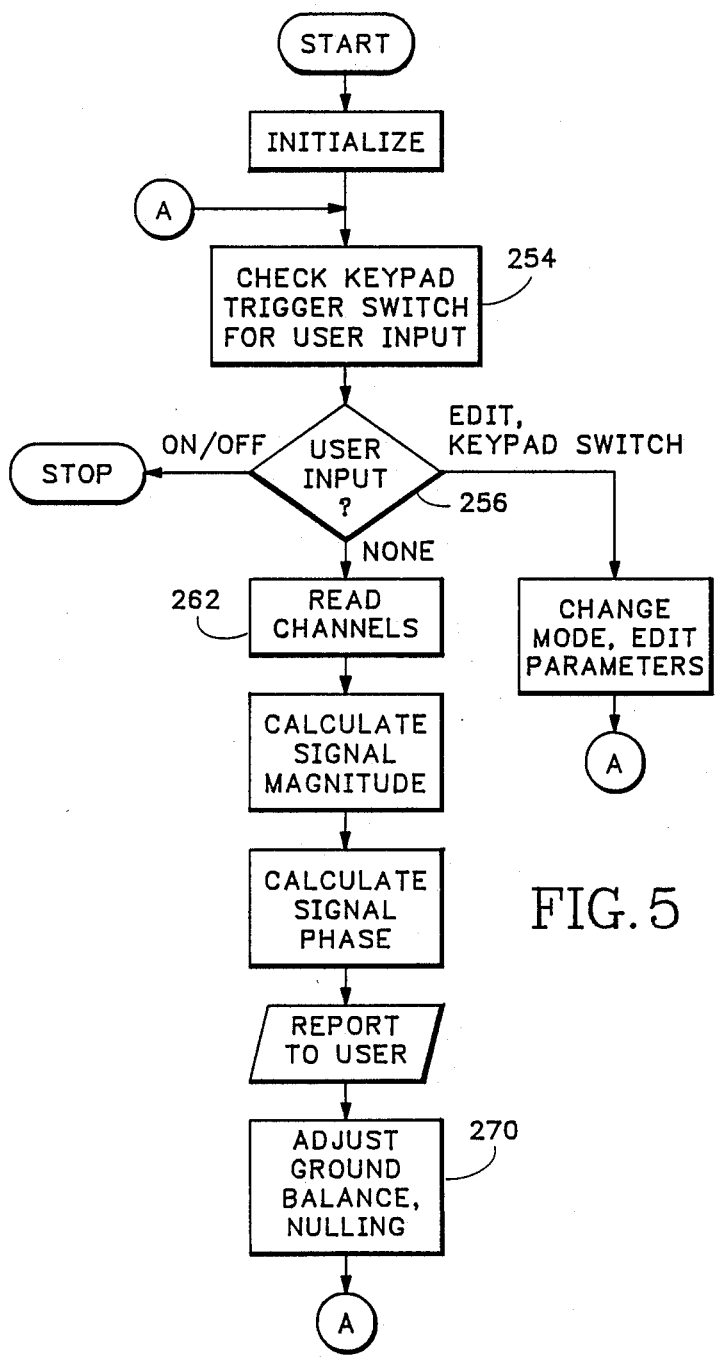
FIG. 7
FIG. 5

METAL DETECTOR WITH MICROPROCESSOR CONTROL AND ANALYSIS

BACKGROUND OF THE INVENTION

The present invention pertains to the field of handheld, induction balanced, metal detectors having ground exclusion and discrimination capabilities.

Induction balanced metal detectors are commonly used for treasure hunting. Two problems have plagued users: false target signals caused by passing the search head loop over mineralized ground, and target signals caused by undesirable targets. Both problems have been dealt with in earlier metal detectors, with varying degrees of success.

Early ground balance metal detectors were difficult to operate, requiring an iterative procedure of adjusting a knob, pulling a trigger operated switch while holding the loop in the air, and lowering the loop to the ground. If the volume of the metal detector's sound signal changed when lowering the loop, the metal detector was not ground balanced. Thus the user repeated the procedure until the detector was ground balanced. Furthermore, when the metal detector was used over ground having a different mineralization, the procedure had to be repeated.

Early induction-balanced metal detectors detected variations in the magnetic field surrounding the search head, responding to all metals, regardless of their composition. Later metal detectors allowed the user to discriminate between ferrous and nonferrous metals. Further advances brought variable discrimination, providing a target signal when the detected object produced a phase that exceeded a user-set value. Variable discrimination allgwed the user to ignore iron objects, such as nails, while still detecting coins. These metal detectors had a single variable discrimination point, accepting, i.e., providing a detection signal to the user in response to, objects causing a phase angle on one side of the selected discrimination point, while rejecting objects causing a phase angle on the otherside. Unfortunately, nickels cause a signal having a smaller phase angle than aluminum pull tabs with respect to a search coil driver signal. If the user set a prior art metal detector to discriminate against pull tabs, the metal detector would not detect nickels. Likewise, if the user set the metal detector to detect nickels, it would also detect pull tabs. Users were thus forced to learn the different "chirps" and "chatters" the metal detector would produce in response to pull tabs, or dig up countless pull tabs to avoid missing nickels.

Handheld metal detectors of the transmit/receive type generally have an audible "pinpoint" feature. When the user has located an apparent target, the metal detector search head is repeatedly passed over the area in decreasing segments, decreasing the "circle of confusion" which contains the target. The metal detector may produce an audible target signal while some inches from the target. As the search head is brought closer to the target, the receive signal increases, increasing the volume of the audible signal.

The receive signal's range of magnitude generally is much greater than the audible signal's dynamic range. Thus, a point is reached when the receive signal increases with no increase in audio signal volume. In the past, metal detectors have handled this problem by supplying a momentary switch for the user to squeeze when the volume reaches a plateau. The present receive signal level is captured and held by a circuit within the audio section of the metal detector. The detector then provides a minimal audio volume in response to the held receive signal's magnitude, with the audio volume increasing when the receive signal increases further. In this manner, an audible signal is produced for increasingly larger receive signals, pinpointing the location of the target.

Such a target pinpointing method requires a degree of skill to use it effectively. Improper pinpointing results in a larger circle of confusion, requiring more digging to locate the target. This may prevent the user from being able to locate targets in grassy areas without unsightly destruction.

What is needed, then, is a metal detector of adequate sensitivity, with the ability to compensate automatically for mineralization of the ground, to respond to changing mineralization, and, furthermore, having the ability to distinguish clearly between different metallic objects, despite their having similar effects on the magnetic field of the search head.

SUMMARY OF THE INVENTION

The present invention supplies an answer to the above-stated needs by combining analog and digital circuits, together with a microprocessor and stored program routines, to provide a metal detector having enhanced capabilities in ground exclusion balance, target discrimination, and user interface. In the metal detector of the invention both discrimination and ground exclusion balance are under microprocessor control, providing improved functional capability and versatility.

It is a principal object of the present invention to provide a metal detector in which a ground exclusion balancing routine is automated and controlled by a microprocessor, giving even beginning metal detector users the benefit of using a metal detector properly balanced to ignore the effects of ground mineralization.

It is another important object of the present invention to provide a metal detector in which, regardless of the initial ground exclusion balance setting, the metal detector can also selectively be set to automatically track any changes in ground mineralization, changing the ground exclusion balance setting whenever required to continue to ignore magnetic effects of soil minerals. If the manual initial ground balance routine is performed improperly, or not at all, the automatic ground balance tracking feature, if selected, will eventually balance the metal detector of the invention.

It is another object of the present invention to provide a metal detector having a comprehensive visual display of the status of the metal detector circuitry and the settings which have been made to control operation of the metal detector, and which provides a visual display representative of the characteristic phase angle of the receive signal resulting from presence of a target within the magnetic field of the search head.

It is another object of the present invention to provide a metal detector including a keypad usable by the operator for entering control information.

It is an important feature of the metal detector of the present invention that it provides microprocessor control of target signal discrimination. The device is capable, in a preferred embodiment, of providing a positive response to each of several selected phase angle ranges, by providing a plurality of memory registers, each corresponding to a different range of phase angles. For example, a memory location could be assigned to each integral number of degrees of phase angle for a range of +6° to −174° relative to the phase of the driver signal. When a target is detected, its characteristic phase angle is calculated. The memory register corresponding to the calculated phase angle is then checked. If the register contains an ACCEPT code, the metal detector signals the user that an accepted target has been found. If the register contains a REJECT code, the metal detector may selectively either signal the user that a rejected target has been found or do nothing. Each of these memory registers may be individually and independently set by a user, who can thus configure the detector to accept such coins as quarters, dimes, pennies, and nickels, while rejecting aluminum pull tabs and iron nails.

It is another important feature of the present invention that is allows the user to "teach" the metal detector to accept or reject a particular item having the capability to affect a magnetic field. To do so, the user operates a "LEARN ACCEPT" or "LEARN REJECT" switch. The user then passes the search head loop assembly over a sample of the item a few times allowing the metal detector to determine the item's characteristic phase angle and set the corresponding memory register to ACCEPT or REJECT. The user then again operates the switch, placing the metal detector back in a search mode, completing the operation.

Additionally, individual ones of the memory registers corresponding to selected phase angle ranges can be set by keypad entry of ACCEPT or REJECT codes, so that a target having produced a phase angle in the selected phase angle range will cause the desired visible and audible outputs from the metal detector.

It is another important feature of the present invention that it provides a metal detector which uses the microprocessor previously mentioned to measure the phase angle of the receive signal of a detected item, at least to the accuracy permitted by the number of memory registers available, by a digital computation based on the resolution of the receive signal into two orthogonal components, each having a known phase relationship to the driver signal.

Yet a further feature of the metal detector of the present invention is that it provides for several different types of audio responses to detection of items which cause perturbations of the periodically changing magnetic field surrounding the search loop during operation of the metal detector. For example, under control of the microprocessor, a standard low volume, tone, motion-discriminate search mode, and a silent motion-discriminate search mode are selectively provided. Also available is a combined mode which reports all perturbations in the magnetic field, regardless of phase angle, with a tone of one audible frequency, and which also reports targets having selected characteristic phase angles with a tone of a recognizably different frequency.

In a pinpointing mode of operation the present invention solves the problem of inadequate audible signal range of amplitude. Whenever the receive signal decreases, the volume of the audible signal decreases. Thus, when the receive signal surpasses the audible signal's available range of volume, the audible signal stays at maximum volume. When the receive signal has peaked and starts to decrease, the maximum receive signal is stored, and the audible signal is reduced in volume automatically as the receive signal decreases from its maximum. Thus, lesser receive signals thereafter provide lesser audible signal volumes. No user action is required.

The foregoing and other objectives, features an advantages of the present invention will be more readily understood upon consideration of the following detailed description of the invention taken in conjunction with the accompanying drawings.

BRIEF DESCRIPTION OF THE DRAWINGS

FIG. 5 is a summary flow diagram of the stored program executed by the main processor.

FIG. 7 is a phasor diagram of a cold start initialization routine, COLD, utilized by the microprocessor portion of a metal detector embodying the invention.

DESCRIPTION OF THE PREFERRED EMBODIMENT

A metal detector which is a preferred embodiment of the present invention is described below. A very similar metal detector manufactured and marketed by White's Electronics, Inc., of Sweet Home, Oregon, under the model name and trademark EAGLE is another embodiment of the present invention.

Circuit Description

Figure 1A:
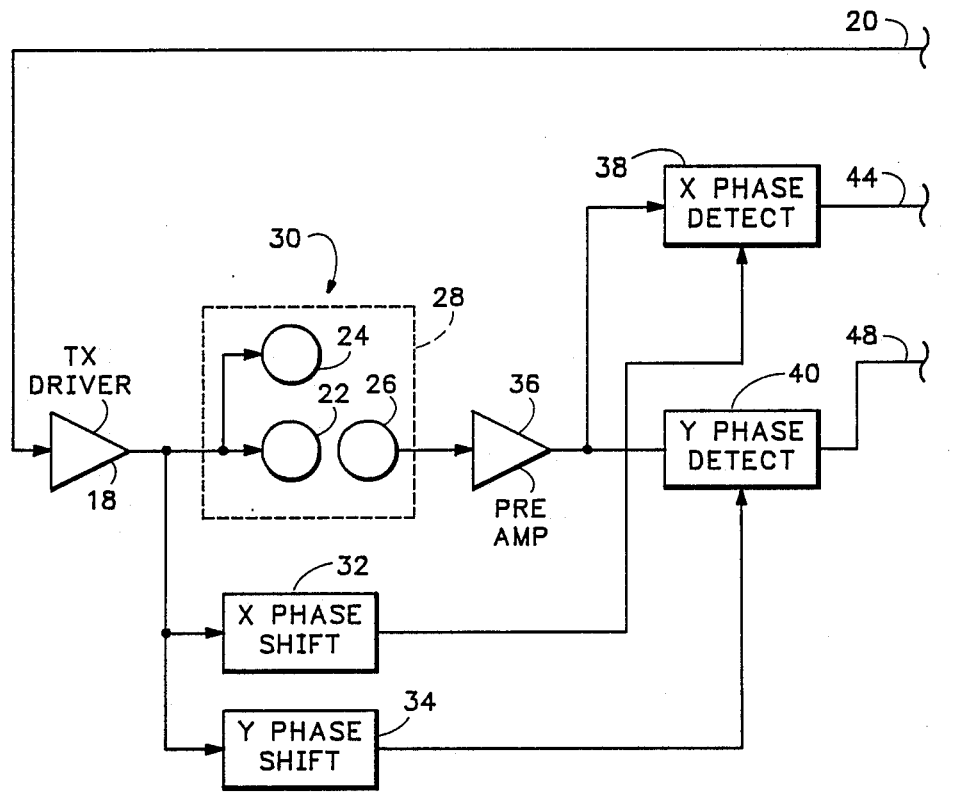
FIGS. 1A–1D, when arranged as shown in FIG. 1D, form a block diagram of a metal detector circuit of the present invention.
Figure 1A:
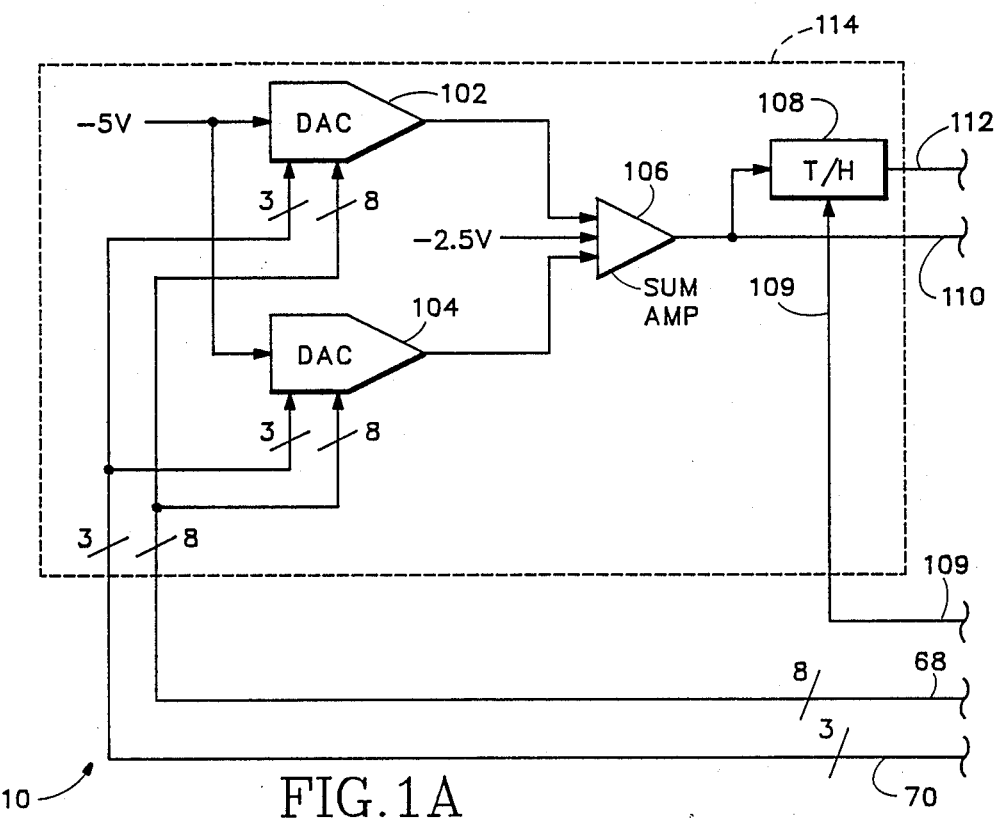
Figure 1B:
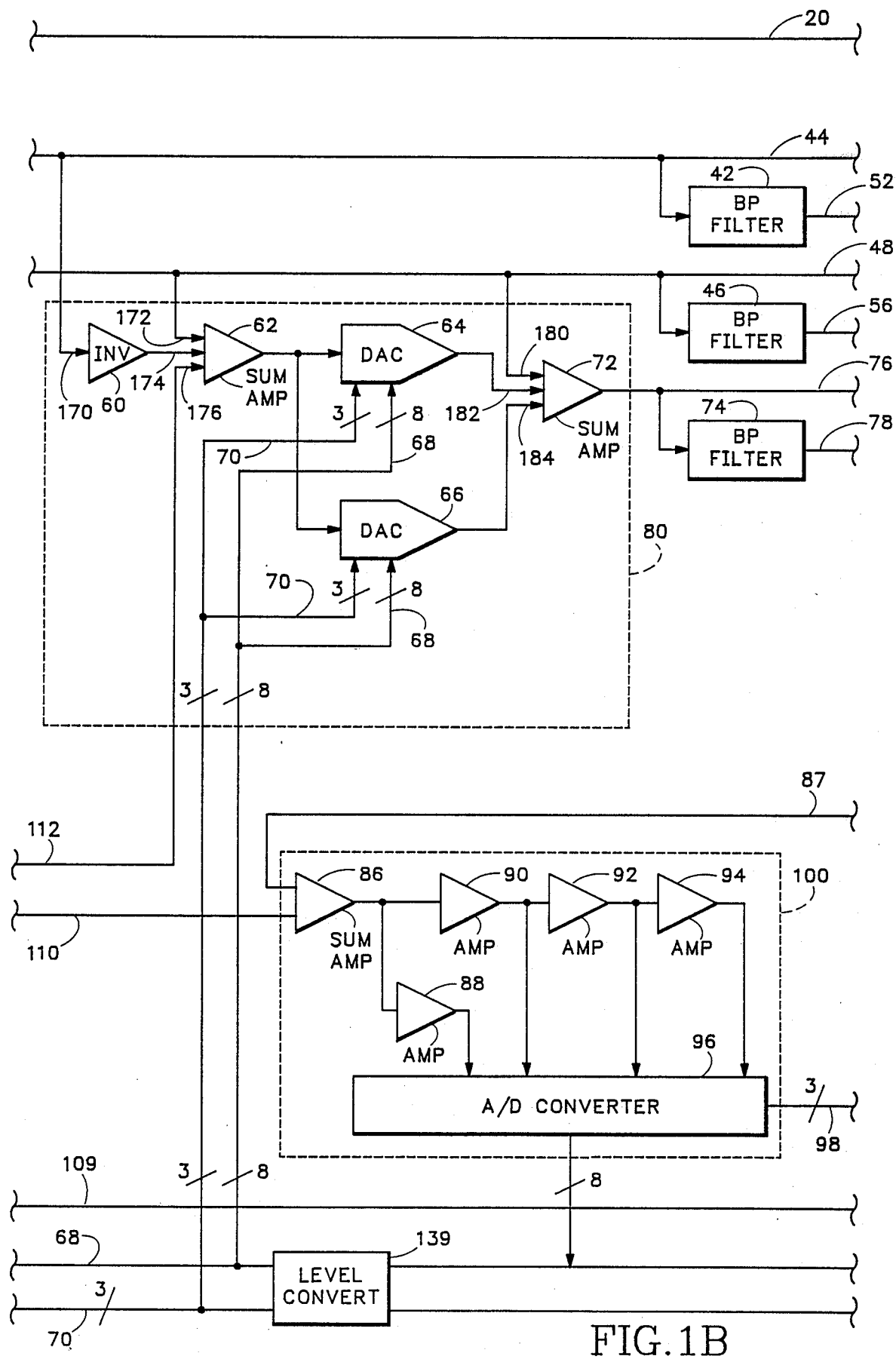
Figure 1C:
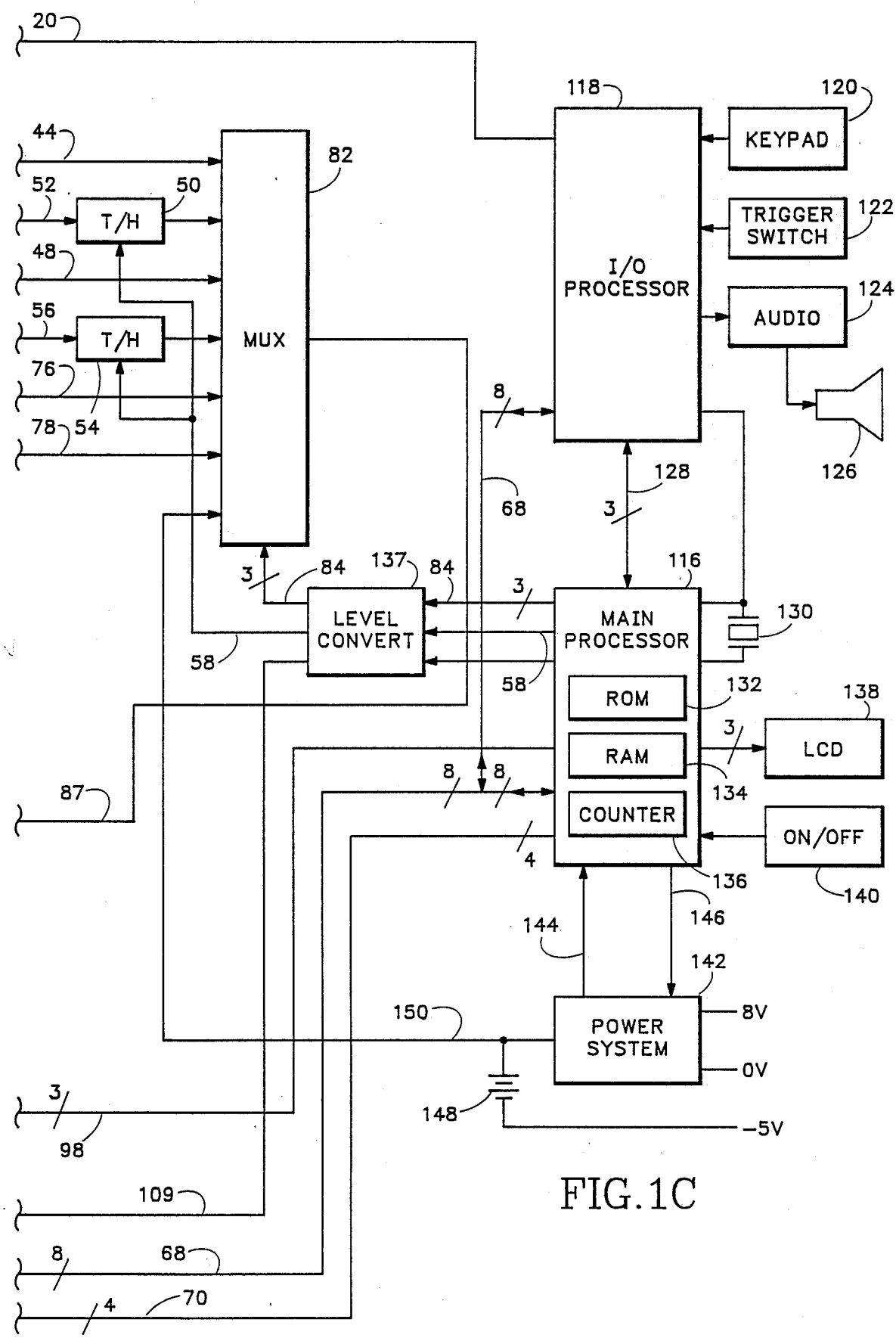
Figure 1D:
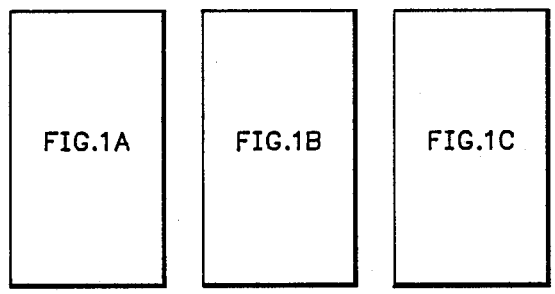

Referring to FIGS. 1A-1C, which, when arranged as shown in FIG. 1D, form a block diagram of a preferred circuit arrangement for a metal detector 10 according to the present invention, a transmit driver 18 is connected to an input/output (I/O) processor 118 via conductor 20. The output of the transmit driver 18 is connected to a transmit coil 22 and a feedback coil 24. The transmit coil 22, the feedback coil 24, and a receive coil 26 are arranged in a coil assembly 30 in a balanced configuration such as is shown in Johnson, U.S. Pat. No. 4,293,816. Surrounding the transmit coil 22, the feedback coil 24, and the receive coil 26 is a Faraday shield 28.

The electrical output of the transmit driver 18 also is connected electrically to an X phase shift circuit 32 and a Y phase shift circuit 34. The receive coil 26 is connected electrically to the input of a preamplifier 36. The output terminal of the preamplifier 36 is connected electrically to an input terminal of an X phase detector 38 and to an input terminal of a Y phase detector 40. The output terminal of the X phase shift circuit 32 is connected electrically to the X phase detector 38, and the output terminal of the Y phase shift circuit 34 is connected to an input terminal of the Y phase detector 40. The output terminal of the X phase detector 38 is connected electrically to a first bandpass filter 42 and to an input terminal of an 8-input-channel multiplexer (MUX) 82 via conductor 44. Likewise, the output terminal of the Y phase detector 40 is connected to a second bandpass filter 46 and to another input terminal of the MUX 82 via conductor 48. The output terminal of the first bandpass filter 42 is connected electrically to an input terminal of a first track/hold circuit 50 via conductor 52. The output terminal of the first track/hold circuit 50 is connected electrically to another input terminal of the MUX 82. The output terminal of the second bandpass filter 46 is connected electrically to an input terminal of a second track/hold circuit 54 via conductor 56. The output terminal of the second track-/hold circuit 54 is connected electrically to another input terminal of the MUX 82. A track/hold control line conductor 58 is connected electrically from a level converter 137 to the first and second track/hold circuits 50 and 54.

The output terminal of the X phase detector 38 is also connected electrically to the input terminal of an inverter 60, and the output terminal of the inverter 60 is connected electrically to an input terminal of a first summing amplifier 62. The output terminal of the Y phase detector 40 is connected electrically to another input terminal of the first summing amplifier 62, whose output terminal is connected electrically to the analog input terminals of first and second digital-to-analog converters (DACs) 64 and 66, which are part of a ground exclusion balance (GEB) system 80. The first and second DACs 64 and 66 will be called "GEB system DACs" at times hereafter. An 8-bit data bus 68 is connected electrically to the digital input terminals of the GEB system DACs 64 and 66. DAC control lines 70 are connected electrically to digital control input terminals of DACs 64 and 66, respectively. The output terminals of the GEB system DACs 64 and 66 are connected electrically to separate input terminals of a second summing amplifier 72. The output terminal of the Y phase detector 40 is also connected electrically to an input terminal of the second summing amplifier 72. The output terminal of the second summing amplifier 72 is connected electrically to an input terminal of a third bandpass filter 74 and another input terminal of the MUX 82, via conductor 76. The output terminal of the third bandpass filter 74 is connected electrically to another input terminal of the MUX 82 via conductor 78. The inverter 60, the first and second summing amplifiers 62 and 72, and the GEB system DACs 64 and 66 are the basic components of the ground exclusion balance (GEB) system 80.

Connected electrically to the MUX 82 are MUX control lines 84. An output terminal of the MUX 82 is connected electrically to an input terminal of a third summing amplifier 86 via conductor 87. The output terminal of the third summing amplifier 86 is connected electrically to the input terminals of a first scaling amplifier 88 and a second scaling amplifier 90. The output terminal of the second scaling amplifier 90 is connected electrically to the input terminal of a third scaling amplifier 92. The output terminal of the third scaling amplifier 92 is connected electrically to the input terminal of a fourth scaling amplifier 94. The output terminals of the first, second, third and fourth scaling amplifiers 88, 90, 92, and 94 are connected electrically to respective separate input terminals of a four-input-channel, 8-bit analog-to-digital (A/D) converter 96. The output signal of the A/D converter 96 is conducted by the 8-bit data bus 68 to an I/O processor 118 and a main processor 116. Also connected electrically to the A/D converter 96 are A/D control lines 98, which come from the main processor 116. The MUX 82, the third summing amplifier 86, the scaling amplifiers 88, 90, 92, and 94, and the A/D converter 96 are all included in the A/D conversion system 100.

Another important subsection of the metal detector 10 is an offset system 114. A 5-volt DC signal is provided to the analog input terminals of third and fourth DACs 102 and 104, which will at times be called "offset system DACs" hereafter. The 8-bit data bus 68 is connected electrically to the digital input terminals of the offset system DACs 102 and 104. DAC control lines 70, carrying control signals originating in the main processor 116, are connected electrically to digital control input terminals of the offset system DACs 102 and 104, respectively. The output terminals of the offset system DACs 102 and 104 are connected electrically to separate input terminals of a fourth summing amplifier 106. A 2.5-volt signal is also provided to another input terminal of the fourth summing amplifier 106. The output terminal of the fourth summing amplifier 106 is connected electrically to a third track/hold circuit 108 and to an input terminal of the third summing amplifier 86 via conductor 110. A conductor 112 connects the output side of the third track/hold circuit 108 to an input terminal of the first summing amplifier 62. A track/hold control line 109 carries a signal from the main processor 116 to another input terminal of the third track/hold circuit 108. The offset system DACs 102 and 104, the fourth summing amplifier 106, and the third track/hold circuit 108 are all part of the offset system 114.

The metal detector circuit also comprises two binary digital microprocessors, a main processor 116 and an input/output (I/O) processor 118. The I/O processor 118 is connected electrically to a keypad 120 which includes an array of momentary contact switches and to a trigger switch 122. The I/O processor 118 is also connected electrically to an audio control circuit 124 which is connected to drive a speaker 126. The I/O processor 118 is also connected electrically to the input terminal of transmit driver 18 via conductor 20.

The I/O processor 118 and the main processor 116 are connected electrically to each other by means of the 8-bit data bus 68 and 3 handshaking lines 128. The I/O processor 118 and main processor 116 also share a clock crystal 130.

The main processor 116 is an 8-bit microcontroller having on-chip read-only memory (ROM) 132, on-chip random access memory (RAM) 134, and an on-chip hardware counter/timer 136. A commercially available processor of this type is the Hitachi HD63705VOP, which is used in this preferred embodiment. Although this particular device used as the main processor 116 has neither address nor data ports, per se, it has general purpose input/output ports. The 8-bit data bus 68 connects such a general purpose port of the main processor 116 to the digital input terminals of the offset system DACs 102 and 104, to the GEB system DACs 64 and 66, to the output port of the A/D converter 96, and to the I/O processor 118.

A second general purpose port of the main processor 116 is connected electrically to the MUX control lines 84, track/hold control lines 58 and 109, and DAC control lines 70. Since the main processor 116 operates between supply voltages of ground and −5 volts while the DACs 64, 66, 102, and 104 operate between supply voltages of +8 volts and ground and track/hold circuits 50, 54, and 108 and MUX 82 operate between supply voltages of +8 volts and −5 volts, level converters 137 and 139 convert the logic levels used by the main processor 116 to corresponding logic levels used by the other circuits.

Three pins of a third general purpose port are used to connect the main processor 116 to a liquid crystal display (LCD) 138. An ON/OFF momentary contact switch 140 is connected electrically to the hardware interrupt pin of the main processor 116.

The metal detector circuit also comprises a power supply system 142. A battery 148 is connected electrically as a source for the power supply system 142, which provides supply voltages of +8 volts, ground, and −5 volts to the metal detector's circuitry. A separate "keep alive" output of the power system 142 is connected electrically to the main processor 116 via conductor 144. A power supply control line 146 connected electrically to an input of the power supply system 142. A conductor 150 provides a battery voltage signal "BAT" directly from the battery 148 to another input terminal of the MUX 82.

Figure 4:
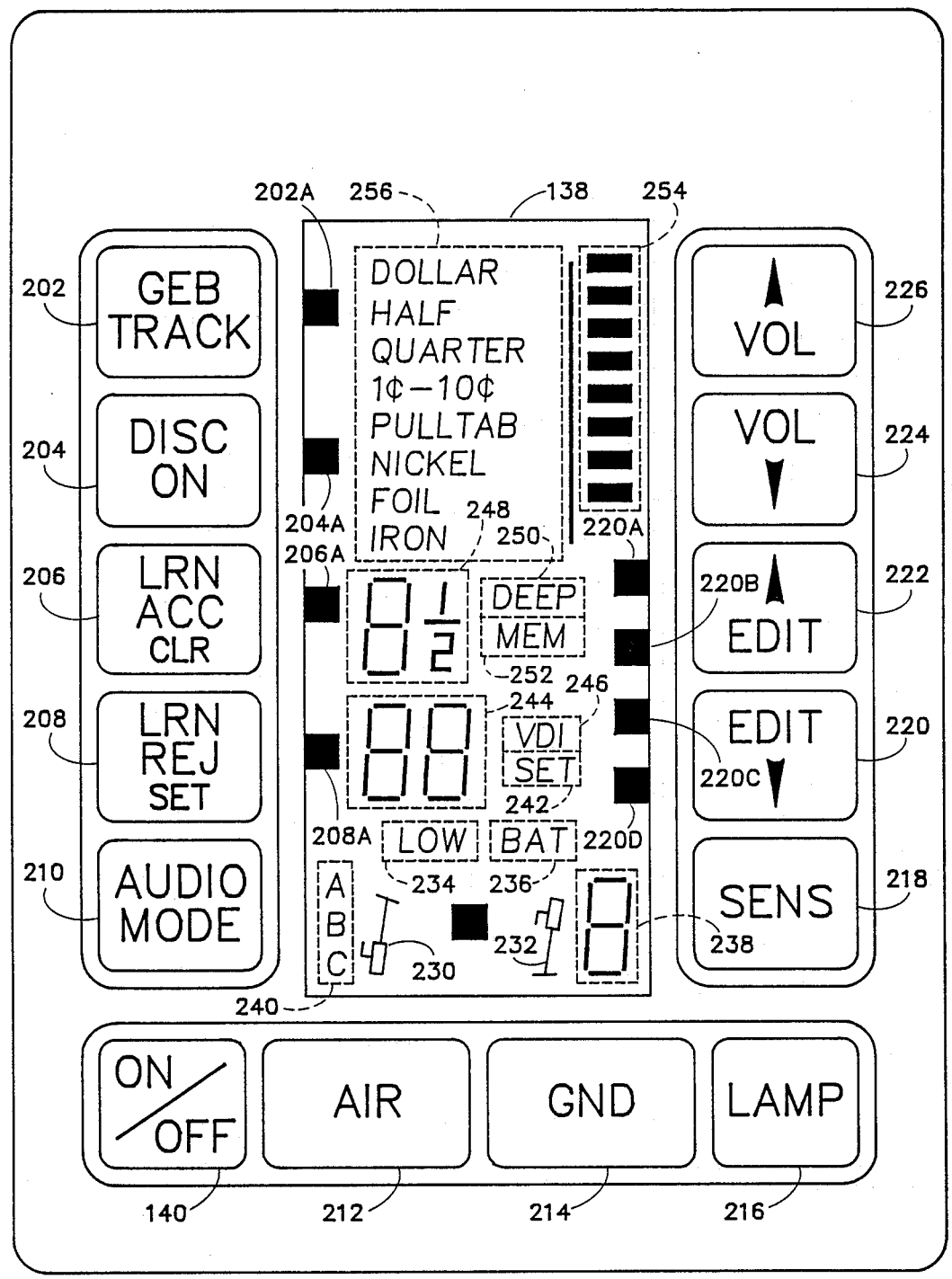
FIG. 4 is a front view of a control panel of a metal detector embodying the present invention.

Referring now to FIG. 4, the LCD 138, ON/OFF switch 140, and the switches of the keypad 120 are included in the control panel 200. Arrayed about the LCD 138 are a GEB TRACK switch 202, a DISCRIMINATE switch 204, a LEARN ACCEPT switch 206, a LEARN REJECT switch 208, an AUDIO MODE switch 210, two VOLUME control switches 226 and 224, an EDIT UP switch 222, an EDIT DOWN switch 220, a SENSITIVITY switch 218, the ON/OFF switch 140, an AIR switch 212, a GROUND switch 214, and a LAMP switch 216. These switches allow the user to control the operation of the metal detector, as will be described below.

Within the LCD 138 are many display elements. The main processor 116 activates display element 202A when the GEB mode is active. Likewise, the main processor 116 activates respective ones of display elements 204A, 206A, or 208A, when any of the discriminate mode, the learn accept mode or the learn reject mode is active. The main processor 116 activates a respective one of display blocks 220A, 220B, 220C, and 220D when the edit mode is active. The main processor 116 activates an air balance prompt symbol 230 and ground balance prompt symbol 232 to inform the user to perform certain operations which will be explained subsequently. The main processor 116 activates LOW and BAT displays 234 and 236 to inform the user of the condition of the battery 148. The main processor 116 controls the digital display 238 to display the current sensitivity setting. The main processor 116 activates one of the letters A, B, and C of display element 240 to display the current audio response mode. The main processor 116 uses a SET display element 242 to display the contents of a DISCRIMINATE memory register, which is described below in connection with the software which controls operation of the metal detector 10. The main processor 116 controls the digital display 244 and the "VDI" display 246 to display a phase number, as is described below. The main processor 116 controls the digital display 248 and the DEEP display 250 to display the calculated depth of a detected object. The main processor 116 activates the MEM display 252 to indicate that the metal detector 10 is in a learn mode. Display blocks 254 are activated by the main processor 116 as a bar graph to display the audio signal volume setting. The main processor 116 also uses display block 254 as a bar graph to display the calculated depth of a detected object with the metal detector 10 in a "pinpointing" mode of operation. The main processor 116 activates the appropriate one of the target name displays 256 when the calculated phase number matches that of a signal caused by a respective target.

Circuit Operation

The I/O processor 118 supplies a square wave signal to the transmit driver 18. Preferably, the frequency of the square wave, which will be called the "system frequency" hereafter, is 6592 hertz. The transmit driver 18 supplies driver signal at the system frequency to the transmit coil 22 and the feedback coil 24. Ideally, the receive coil 26 produces no output signal, called hereafter a "receive signal," when the coil assembly 30 is positioned away from the magnetic field-altering effects of ground mineralization or metals. However, since perfect coil balancing is virtually impossible, the receive coil 26 does produce a minimal receive signal in the absence of such external magnetic field-altering effects. The receive coil 26 produces a receive signal in response to changes in the magnetic field of the transmit coil 22. Such changes may be caused by both mineralized ground and metallic objects near the coil assembly 30.

The Faraday shield 28 surrounding the coil assembly 30 shields the receive coil 26 from external electric fields and also dissipates induced static electricity.

The preamplifier 36 amplifies and bandpass filters the receive signal, attenuating the magnitude of receive signal components having frequencies far from the system frequency.

Figure 2:
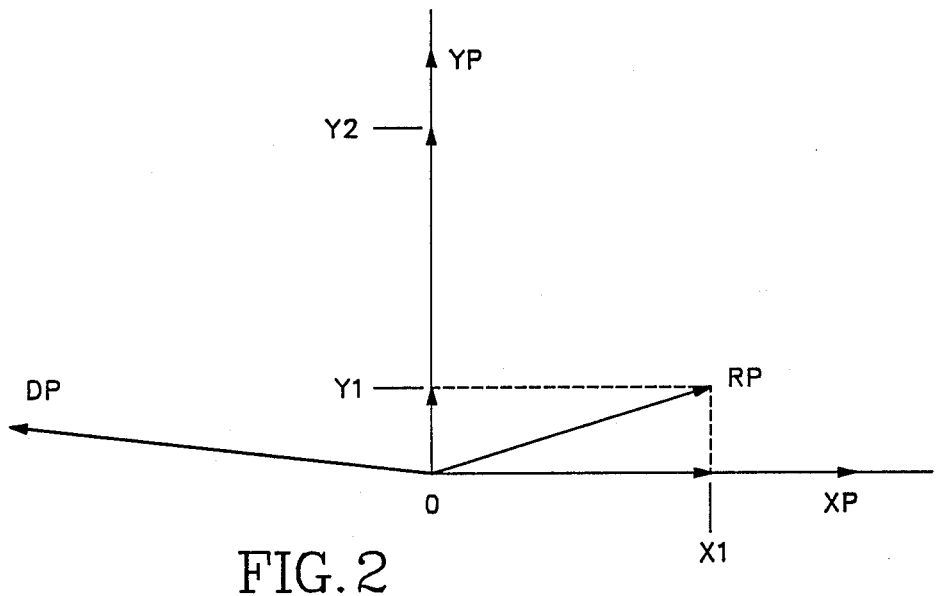
FIG. 2 is a phasor diagram showing phase relationships among selected signals of said metal detector circuit.

The X phase shift circuit 32 provides a square wave reference signal, hereafter called "X reference signal," to the X phase detector 38. Likewise, the Y phase shift circuit 34 provides a square wave "Y reference signal" to the Y phase detector 40. Referring to FIG. 2, the phase of the driver signal is represented by phasor $D_p$. The Y reference signal lags the driver signal in phase by about 84 degrees and is represented by phasor $Y_p$. The X reference signal lags the driver signal in phase by about 174 degrees and is represented by phasor $X_p$. Thus, the X reference signal and the Y reference signal are in quadrature with respect to each other.

The X phase detector 38 and the Y phase detector 40 are nearly identical. Each phase detector produces a DC signal whose amplitude corresponds with the magnitude of the analog input signal and the phase angle relationship between the analog input signal and the square wave reference signal provided to the phase detector. Thus, the X phase detector 38 produces an output signal voltage corresponding to the magnitude of the receive signal and the phase angle relationship between the output signal from the preamplifier 36 and the X reference signal. Likewise, the Y phase detector 40 produces an output signal voltage corresponding to the magnitude of the receive signal and the phase angle relationship between the output signal from the preamplifier 36 and the Y reference signal. The DC output signals from the X phase detector 38 and the Y phase detector 40 will be called hereafter the "XD" and "YD" signals, respectively.

In FIG. 2, a typical receive signal is represented by phasor $R_P$. The output of the X phase detector 38, XD, is represented by the distance between the origin O and the point X1. If the X and Y phase detectors were identical, YD would be the value represented by the distance between the origin 0 and the point Y1. However, the Y phase detector 40 has four times the gain of the X phase detector 38. Thus, YD is represented by the distance between the origin 0 and the point Y2. XD and YD, taken together, provide information from which the phase and magnitude of the receive signal may be calculated. By increasing the gain of the Y phase detector 40, the phase angle of the receive signal may be calculated with higher resolution since the phase angles characteristic of most desirable targets are in the range of 150° to 180° lagging the drive signal.

Minerals in the ground cause receive signals that are generally close to being in phase with the driver signal, with different mineralizations causing receive signals having different phases. The X phase detector produces a zero, or "null," output for receive signals in quadrature with its "detection axis," the X reference signal. Likewise, the Y phase detector produces a null signal output for receive signals in quadrature with its "detection axis," the Y reference signal. The GEB system 80 produces a null output for receive signals caused by ground mineralization. Rather than using another phase detector receiving a reference from an adjustable phase shift circuit, the metal detector 10 forms the GEB output signal as a selected ratio of XD and YD. By varying the ratio, the phase angle of the GEB system detection axis can be selected by the main microprocessor 116 anywhere between the detection axes of the X and Y phase detectors 38 and 40. The output signal of the GEB system will exhibit a null for a phase angle in quadrature with the GEB detection axis.

Referring again to FIGS. 1A–1D, the GEB system 80 produces a DC output signal, hereafter called "GD." Each DAC multiplies its analog input signal voltage by a latched, 8-bit input, yielding an analog output. The DAC interprets 8-bit binary coded input number as ranging between 0 and 255/266, thus a DAC's output ranges between 0 and nearly the input signal voltage. Since more than 8-bit resolution is required for the present purpose, the output signals from the two GEB system DACs 64 and 66 are used, with appropriate gains at the second summing amplifier 72. As the DAC digital inputs are latched, the 8-bit data bus 68 is sufficient. Three DAC control lines 70 allow the main processor 116 to select which DAC latches data from the 8-bit data bus 68.

The gains which the inverter 60 and the first and second summing amplifiers 62 and 72 provide for their respective input terminals are shown in Table 1.

TABLE 1

| Input Terminal | Gain |
|---|---|
| 170 | −1.0 |
| 172 | −0.256 |
| 174 | −1.0 |
| 176 | 2.26 |
| 180 | 2.5 |
| 182 | 9.3 |
| 184 | 0.45 |

Thus, the output signal of the second summing amplifier 72, the output signal of the GEB system 80, hereafter called "GD," may be described according to the following equation:

$$GD = (XD - 0.256*YD + 2.2 - 6*OS)*(9.3*MSB/255 + 0.45*LSB/255) + 2.5*YD$$

where OS is the output of the third track/hold circuit 108, MSB is the value of the 8-bit digital input data latched into GEB system DAC 64, and LSB is the value of the 8-bit digital input data latched into GEB system DAC 66. Breaking GD into its component parts yields the equation:

$$GD = (0.0364*MSB + 0.00176*LSB)*XD + (-0.00934*MSB + 0.000451*LSB + 2.5)*YD + (0.0824*MSB + 0.00399*LSB)*OS$$

If MSB, LSB, and OS are all zero, GD is 2.5*YD. When both MSB and LSB equal 255, and OS is zero, GD is 9.75*XD + 0.0040*YD. Values for the XD and YD components of signal GD for various arbitrarily selected values of MSB and LSB are shown in Table 2.

TABLE 2

| | Components of Signal GD | | |
|---|---|---|---|
| MSB | LSB | XD | YD |
| 0 | 0 | 0.00 | 2.50 |
| 0 | 1 | 0.0017 | 2.49 |
| 0 | 2 | 0.0035 | 2.49 |
| 35 | 254 | 1.72 | 2.06 |
| 35 | 255 | 1.72 | 2.06 |
| 36 | 0 | 1.31 | 2.16 |
| 36 | 1 | 1.31 | 2.16 |
| 255 | 253 | 9.74 | 0.0049 |
| 255 | 254 | 9.75 | 0.0044 |
| 255 | 255 | 9.75 | 0.0040 |

Thus, the GEB system 80 allows the XD:YD component ratio to range approximately between 0:2.5 and 9.75:0. Taking into account the initial gain discrepancy between the X phase detector 38 and the Y phase detector 40, the XD:YD ratio ranges between 0:2.5 and about 2.44:0. Note that the XD and YD component values are not perfectly monotonic. Due to analog component tolerances, the GEB system achieves approximately 14-bit resolution, rather than 16-bit resolution.

Figure 3:
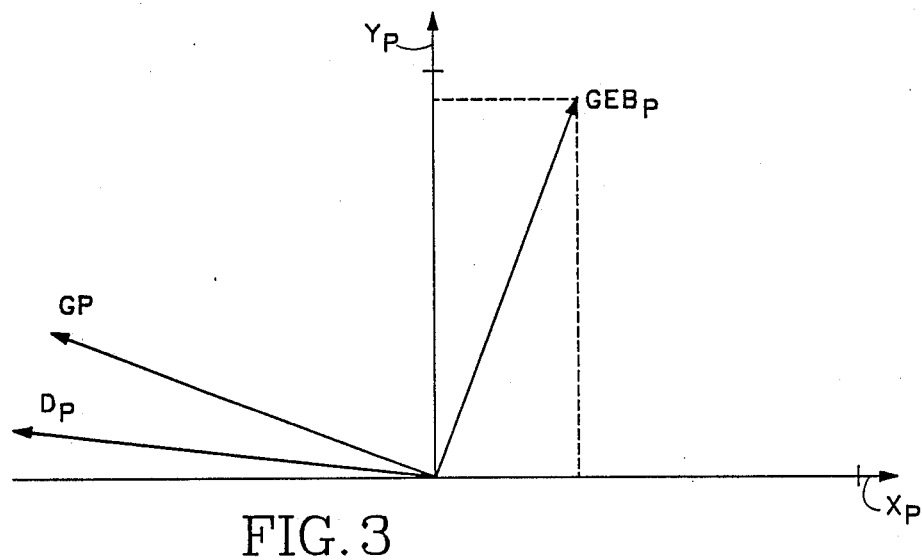
FIG. 3 is a phasor diagram similar to that of FIG. 2 and showing phase relationships among some additional selected signals of said metal detector circuit.

Referring to FIG. 3, the X detection axis $X_p$ and the Y detection axis YP are shown. Also shown is the phase of the driver signal as phasor $D_p$. A ground mineralization-caused receive signal is represented by phasor $G_p$. A detection axis GEBP as shown would exhibit a null for a signal in phase with $G_p$, regardless of the signal's magnitude.

The first summing amplifier 62 allows an offset voltage to be added, allowing the receive signal of an imperfectly balanced coil assembly 30 to be cancelled, as will be discussed later.

Bandpass filters 42, 46 and 74 are matched filters, each attenuating signals having a frequency less than 15 hertz. The first bandpass filter 42 bandpass limits signal XD, and passes an output signal hereafter called "XF." Likewise, the second and third bandpass filters 46 and 74 bandpass limit signals YD and GD, respectively, and pass output signals hereafter called "YF" and "GF." Receive signals caused by mineralized ground change slowly, usually in response to the coil assembly 30 changing position relative to the ground. Signals XF, YF and GF, being bandpass filtered, contain essentially no components caused by effects of ground mineralization.

The main processor 116 uses track/hold control line 58 to command both the first and second track/hold circuits 50 and 54 to "hold." The main processor 116 uses MUX control lines 84 to indicate to the MUX 82 which MUX input channel to route to the MUX output. The track/hold circuits 50 and 54 allow the MUX 82 to route sequentially to the remainder of the A/D conversion system 100 XF and YF signals that occurred at the same instant.

The A/D conversion system 100 uses the four scaling amplifiers 88, 90, 92 and 94 to get more than 8-bit resolution from the 8-bit A/D converter 96. The first scaling amplifier 88 has a gain of $-0.5$ and the second, third and fourth scaling amplifiers 90, 92, and 94 have gains of $-8$. These gains are selected so that at least one of the four inputs of the A/D converter 96 will be within the input range of the A/D converter 96. The main processor 116 uses the largest magnitude, nonsaturated input of the A/D converter for its calculations. The 8-bit output of the A/D converter, combined with the identification of the A/D input channel read, provides information from which a value having a predetermined relationship to the input to the analog-to-digital system can be calculated.

The DC offset system 114 can provide a DC signal in the range of $\pm 2.5$ volts. Due to analog component variation tolerances, the resolution of the offset system 114 is approximately 14 bits, rather than 16 bits.

The I/O processor 118 provides many support functions. It scans the keypad 120 and the trigger switch 122 periodically for user input, providing de-bounce. The I/O processor 118 also controls the audio circuitry 124, providing chop at four frequencies. The I/O processor also provides the transmit driver 18 with a 6595 hertz square wave signal.

The power supply system 142 provides regulated 8-volt, ground, and $-5$-volt supply lines to the metal detector circuit. The power supply system 142 receives unregulated power from a battery 148. The power supply system 142 also provides a keep-alive voltage to the main processor 116 via conductor 144. When the metal detector is turned off, the keep-alive voltage provides a small amount of power to the main processor 116, maintaining any data in the on-chip RAM 134. Thus power is provided to the main processor 116 whenever a sufficiently charged battery 148 is present. The main processor 116 provides a signal over power system control line 146 to cause the power supply 142 to switch between keep-alive and full power states.

Software Description

The main processor 116 executes a program stored in the on-chip ROM 132. FIG. 5 shows an overview of the program. When the metal detector is turned on, the main processor 116 initializes certain settings to default values determined by the stored program. These settings affect target phase angle discrimination, report mode, sensitivity, maximum volume of the speaker 126, and ground exclusion balance settings. The main processor 116 then starts executing a loop of instructions starting with step 254 shown in FIG. 5. As step 254, the main processor 116 first checks whether any switches have been pressed on the keypad 120 or whether the trigger switch 122 has changed position. Depending on the results of the check, the main processor 116 executes various stored program routines. If none of the switches on the control panel 200 was pressed, the main processor 116 reads the reads signals XD, XF, YF, GD, and GF as step 262. From these signals the main processor 116 calculates the amplitude and phase of the receive signal. The main processor 116 then reports any detected and selected targets to the user, the type of reporting depending on the report mode selected by the user. The main processor then adjusts the ground exclusion balance settings and nulls any drifting signals as step 270. This routine is carried out about 100 times a second during normal operation of the metal detector 10.

If a switch on the keypad 120 or the trigger switch 122 had changed state since the most recent previous performance of step 256, the main processor would have then allowed the user to change parameters affecting discrimination, report mode, sensitivity, volume, and ground balance settings. If the ON/OFF switch 140 is pressed, the main processor 116 would have turned the metal detector off. Various separate routines included in the stored program executed by the main processor 116 will be discussed in more detail subsequently.

1. Metal Detector Initialization

Memory register arrays are reserved in the on-chip RAM 134 for storing values associated with the different input channels of the MUX 82. These registers have the storage capacities as shown in Table 3.

TABLE 3

|    | OFFTAB | REFTAB | ERRTAB | VALTAB | GANTAB |
|----|--------|--------|--------|--------|--------|
| GD | 16 bits | 8 bits | 8 bits | 8 bits | 8 bits |
| GF | 16 bits | 8 bits | 8 bits | 8 bits | 8 bits |
| XF | 16 bits | 8 bits | 8 bits | 8 bits | 8 bits |
| YF | 16 bits | 8 bits | 8 bits | 8 bits | 8 bits |
| XD | 16 bits | 8 bits | 8 bits | 8 bits | 8 bits |
| YD | 16 bits | 8 bits | 8 bits | 8 bits | 8 bits |

TABLE 3-continued

|     | OFFTAB  | REFTAB | ERRTAB | VAL-TAB | GAN-TAB |
|-----|---------|--------|--------|---------|---------|
| BAT | 16 bits |        |        |         |         |
| GBO | 16 bits |        |        |         |         |
| GEB | 16 bits |        |        |         |         |

The names at the left of Table 3, with the exception of GBO and GEB, are the names of the signals input to MXX input channels. Hereafter, reference to MUX input channels will be made by use of the name of the signal provided as an input to the respective MUX input terminals. The names at the tops of the columns of Table 3 are the names of the memory register arrays. Hereafter, when referring to a memory register associated with a MUX input channel, the array's name will be given followed by the channel's name within parentheses, e.g. OFFTAB(XF).

Each OFFTAB memory register contains a 16-bit number. During execution of a program routine, generally, the main processor 116 writes the most significant byte of a selected OFFTAB memory register to offset system DAC 102 and the least significant byte of the same OFFTAB memory register to offset system DAC 104. The main processor 116, using MUX control lines 84, commands the MUX 82 to route the signal received through the MUX input channel associated with the selected OFFTAB memory register to the MUX output terminal. The output signal from the offset system 114 is added to the output signal from the MUX 82 at the third summing amplifier 86. In this manner, the offset system 114 allows the signals corresponding to each MUX input channel, e.g. XD, XF, YD, YF, GD, GF, and BAT, to be DC shifted a unique amount before conversion to binary digital form by the A/D converter system 100.

Although GBO and GEB are not names of input channels for MUX 82, these two OFFTAB memory registers are also reserved. The main processor 116 writes the high order byte from memory register OFFTAB(GBO) to offset system DAC 102 and the low order byte from OFFTAB(GBO) to offset system DAC 104. The main processor then commands the third track/hold circuit 108 to hold the output of the fourth summing amplifier 106. Likewise, the main processor 116 writes the high order byte from OFFTAB(GEB) to GEB system DAC 64 and the low order byte from OFFTAB(GEB) to GEB system DAC 66.

The REFTAB, GANTAB, and VALTAB memory register arrays are used for storing A/D converter readings. Each ERRTAB memory register contains an 8-bit number representing an accumulated error which the main processor 116 uses when executing the routine AUTOZERO 890, shown in FIG. 26, and discussed below.

Also reserved in the on-chip RAM 134 are 192 DISCRIMINATE memory registers used to store ACCEPT or REJECT codes. These DISCRIMINATE registers are arranged in a linear array and are indexed by phase numbers ranging from −96 to 95. Throughout this specification, DISCRIMINATE(PHASE#) denotes the DISCRIMINATE memory register indexed by the phase number "PHASE#."

Figure 6:
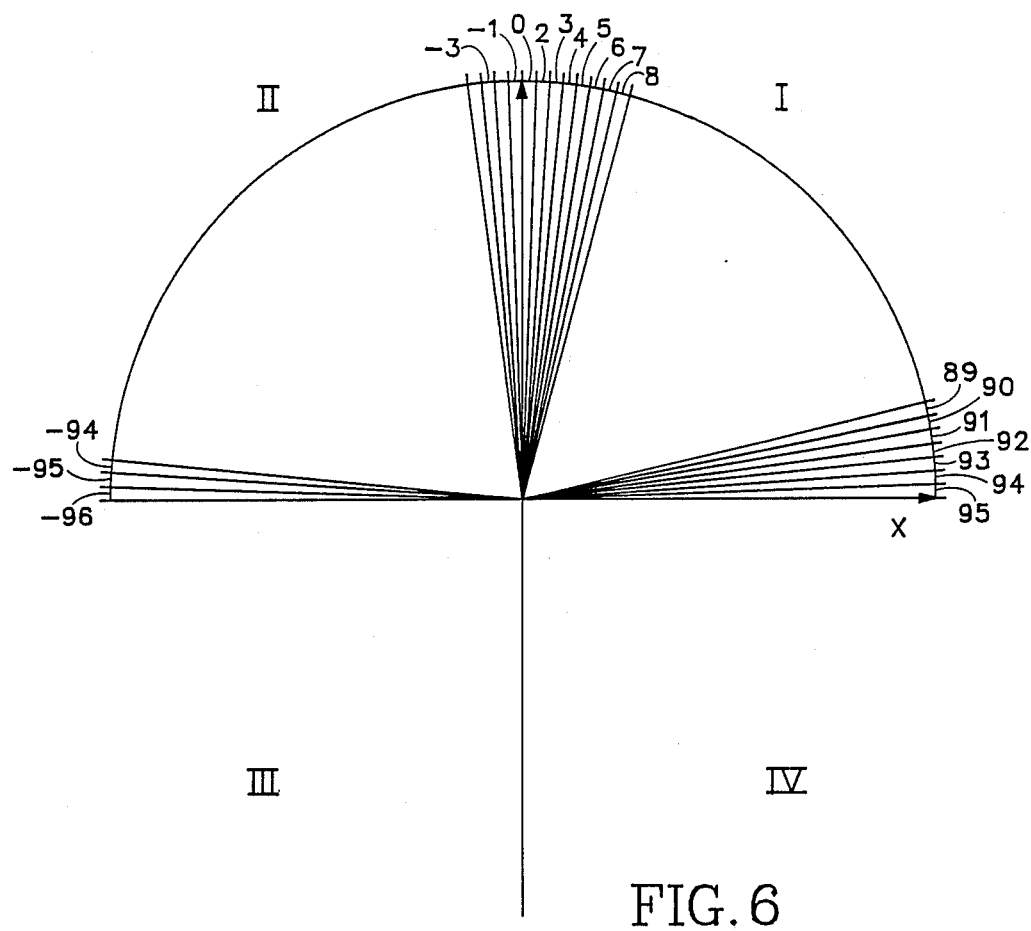
FIG. 6 is a phasor diagram showing the mapping of the DISCRIMINATE memory registers.

The DISCRIMINATE memory registers map into quadrants I and II, as shown in FIG. 6, with phase number 95 corresponding to a phase angle matching the X reference signal, and phase number −96 corresponding to a phase angle that leads the X reference signal by 180 degrees. The PHASE numbers of the remaining DISCRIMINATE memory registers linearly map therebetween. To conserve space, each register occupies only 1 bit, requiring only 24 bytes for all 192 registers.

Power is applied to the main processor 116 whenever a charged battery 148 is present. The main processor 116 is in one of two states: running or standby. When a battery 148 is first installed in the metal detector, the main processor 116 executes the stored program routine COLD 300, shown in the flow diagram of FIG. 7. In performing COLD 300 the main processor 116 sequentially clears the RAM 134, step 302, and sets preset values for the DISCRIMINATE, REFTAB, and ERRTAB memory registers, step 304, shuts down its general purpose ports to conserve battery power, step 306, turns off the LCD 138, step 308, and commands the power system 142 to turn off, step 310, providing only keep-alive power to the main processor 116. The main processor then switches to a standby state, step 312, in which the metal detector 10 uses minimal power while the main processor 116 is waiting for an interrupt signal from ON/OFF switch 140.

Figure 8:
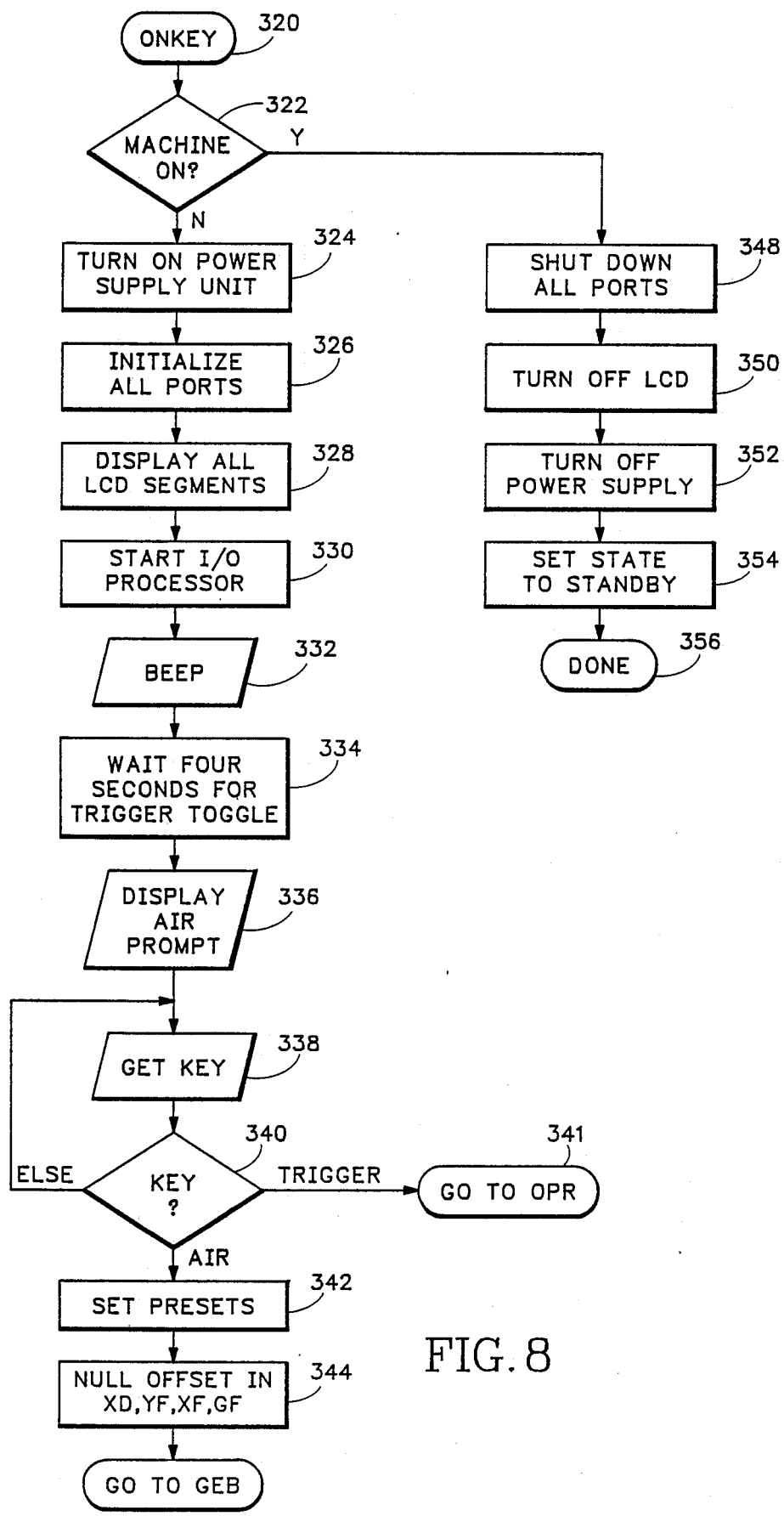
FIG. 8 is a flow diagram of an ONKEY routine.

The ON/OFF switch 140 is connected electrically to the hardware interrupt pin of the main processor 116 (FIG. 1C). Whenever the ON/OFF switch 140 is pressed, the main processor 116 executes a stored program routine ONKEY 320, shown in FIG. 8. If the metal detector is off when the ON/OFF switch 140 is pressed, the main processor 116 commands the power supply to provide power to the rest of the metal detector, steps 322, 324. The main processor 116 then sets its general purpose ports to communicate with the rest of the circuitry, step 326. As step 328, the main processor 116 commands the LCD 138 to display each display element, allowing the user to check for a display malfunction. The main processor 116 then starts the I/O processor 118, step 330, and commands it to sound a beep, step 332. The main processor 116 waits four seconds, step 334, and then clears the LCD 138 and then displays the AIR prompt 230, step 336.

At start-up, the user may perform a procedure to "ground balance" the metal detector. The user also has other configuration options affecting discrimination, tracking of ground exclusion balance, sensitivity and audio response mode. These options allow the user to customize the metal detector's operation. If the user wishes the metal detector to remain in the same configuration as when it was turned off, the user toggles the trigger switch 122. Otherwise, the user lifts the coil assembly away from the ground and any other magnetic field altering materials and presses the AIR switch 212.

The main processor 116 asks repeatedly of the I/O processor 118 if user input has occurred, as step 338, 340. If the user operates the trigger switch 122, the main processor 116 exits the ONKEY routine 320, from step 341, and continues execution, step 440, of the main loop routine, OPR 440.

If the user presses the AIR switch 212 while the main processor 116 is waiting for input, steps 338 and 340, the main processor 116 continues executing the ONKEY routine at step 342, setting preset values in RAM 134 for DISCRIMINATION memory registers, audio mode, and sensitivity, thus placing the metal detector in a general purpose search mode, step 342. The main processor 116 then calls a subroutine ADJUST 400 four times, passing the parameters "ADO:XD," for the first execution, and the parameters "ADO:YF," "ADO:XF," and "ADO:GF," for the subsequent executions of routine ADJUST 400 nulling any offsets in the XD, YF, XF, and GF signals, step 344. The routine ADJUST 400 and the interpretation of the parameters will be explained below. These offsets may be caused by an imperfectly nulled balanced coil assembly 30 or offset drift in the operational amplifiers that make up the circuitry. The main processor 116 continues by executing a stored program routine named GEB and shown in flow diagram form in FIG. 9.

Returning momentarily to FIG. 8, if the metal detector is on when the ON/OFF switch 140 is pressed, step 322, the main processor 116 executes a routine similar to the COLD routine 300. The main processor 116 shuts down its general purpose ports to conserve battery power, step 348, turns off the LCD 138, step 350, and commands the power system 142 to turn off, step 352, providing only keep-alive power to the main processor 116. The main processor 116 then switches to a standby state, using minimal power while waiting for an interrupt signal, step 354.

Figure 9:
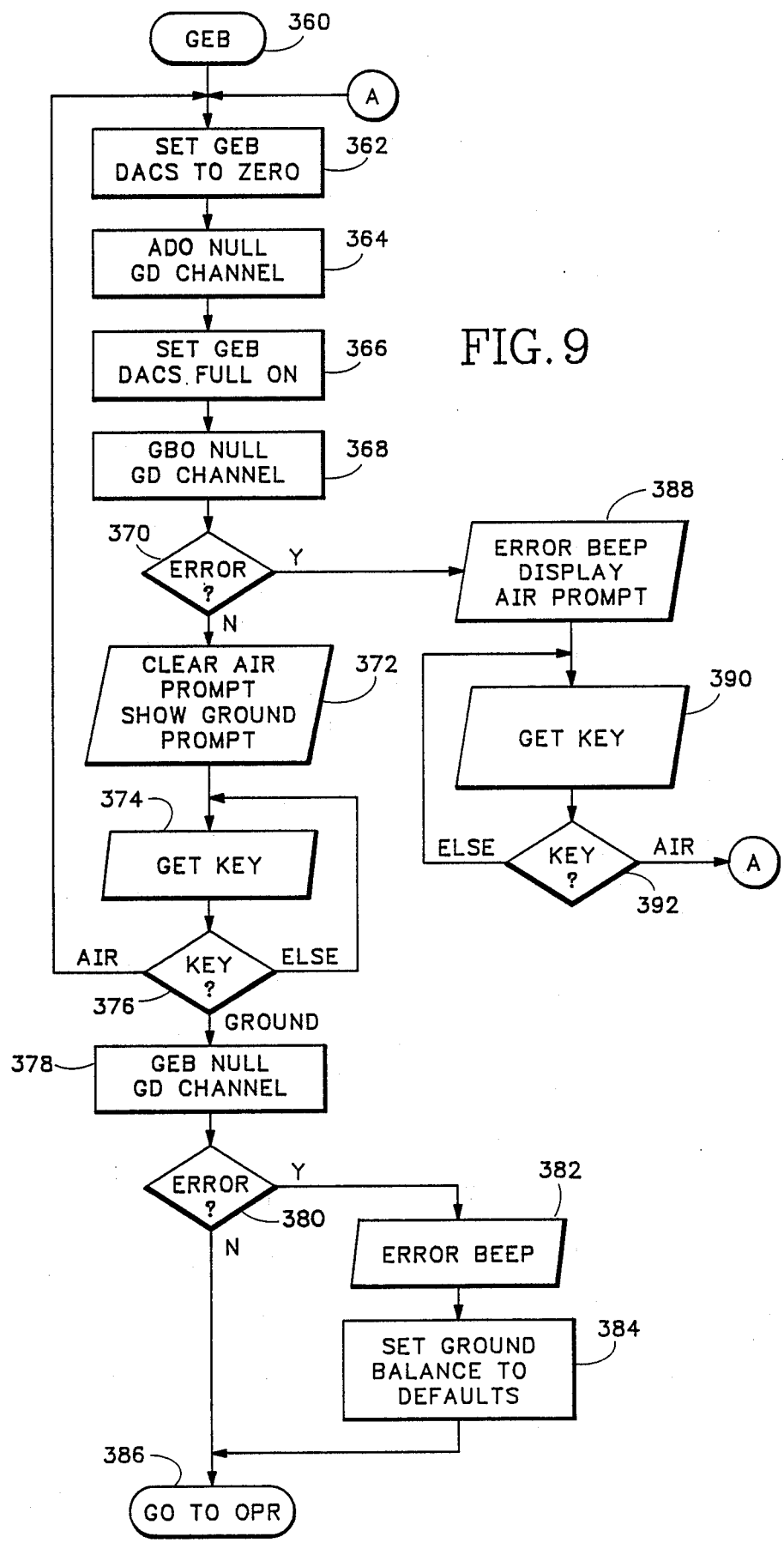
FIG. 9 is a flow diagram of a ground exclusion balance routine, GEB.

FIG. 9 shows the stored "GEB" 360 routine of the program which the main processor 116 executes to ground balance the metal detector, that is, to set the detection axis of the GEB system 80 at quadrature with receive signals resulting from the effects of mineralized ground. The main processor 116 executes the GEB routine 360 whenever the AIR switch 212 is pressed. In performing the GEB routine 360, the main processor 116 first latches the digital inputs of both GEB system DACs 64 and 66 to zero, step 362, and then executes routine ADJUST 400, step 364, passing the parameters "ADO:GD." The main processor 116 then latches the value 255 into digital inputs of both GEB system DACs 64 and 66, step 366, and executes the routine ADJUST 400, passing the parameter "GBO," step 368. In executing the routine ADJUST 400, with the parameters ADO:GD and GBO, the main processor 116 calculates and stores values in the RAM 134 that allow it to cancel the effects of an imperfectly balanced coil assembly 30 or operational amplifier offset drift.

If the main processor 116 sets an out-of-range error flag in the most recent execution of the ADJUST routine, the main processor 116 commands the LCD 138 to display the AIR prompt 230 (FIG. 4) and commands the I/O processor 118 to cause the speaker 126 to beep, steps 370 and 388. The main processor 116 then waits until the I/O processor 118 tells the main processor 116 that the AIR switch 212 has been pressed, steps 390 and 392, at which time the main processor 116 restarts executing the GEB routine at step 362.

If the main processor 116 did not set the out-of-range error flag, the main processor 116 commands in step 372 the LCD 138 to clear the AIR prompt 230, and display the GROUND prompt 232. The GROUND prompt 232 is a direction to the user to place the loop assembly nearly touching the ground and then press the GROUND switch 214. When the I/O processor 118 tells the main processor 116 that the GROUND switch has been pressed, steps 374 and 376, the main processor 116 executes the ADJUST routine 400, FIG. 10, passing the parameter "GEB," setting the detection axis of the ground exclusion balance system 80 in quadrature with the ground-caused receive signal.

If the main processor 116 set an error flag in executing the ADJUST routine 400 in step 378, it commands the I/O processor 118 to beep and sets OFFTAB(GEB) to a default value, steps 380, 382 and 384. The main processor 116 then exits the GEB routine 360 and starts executing a stored program "OPR" routine 440.

Figure 10:
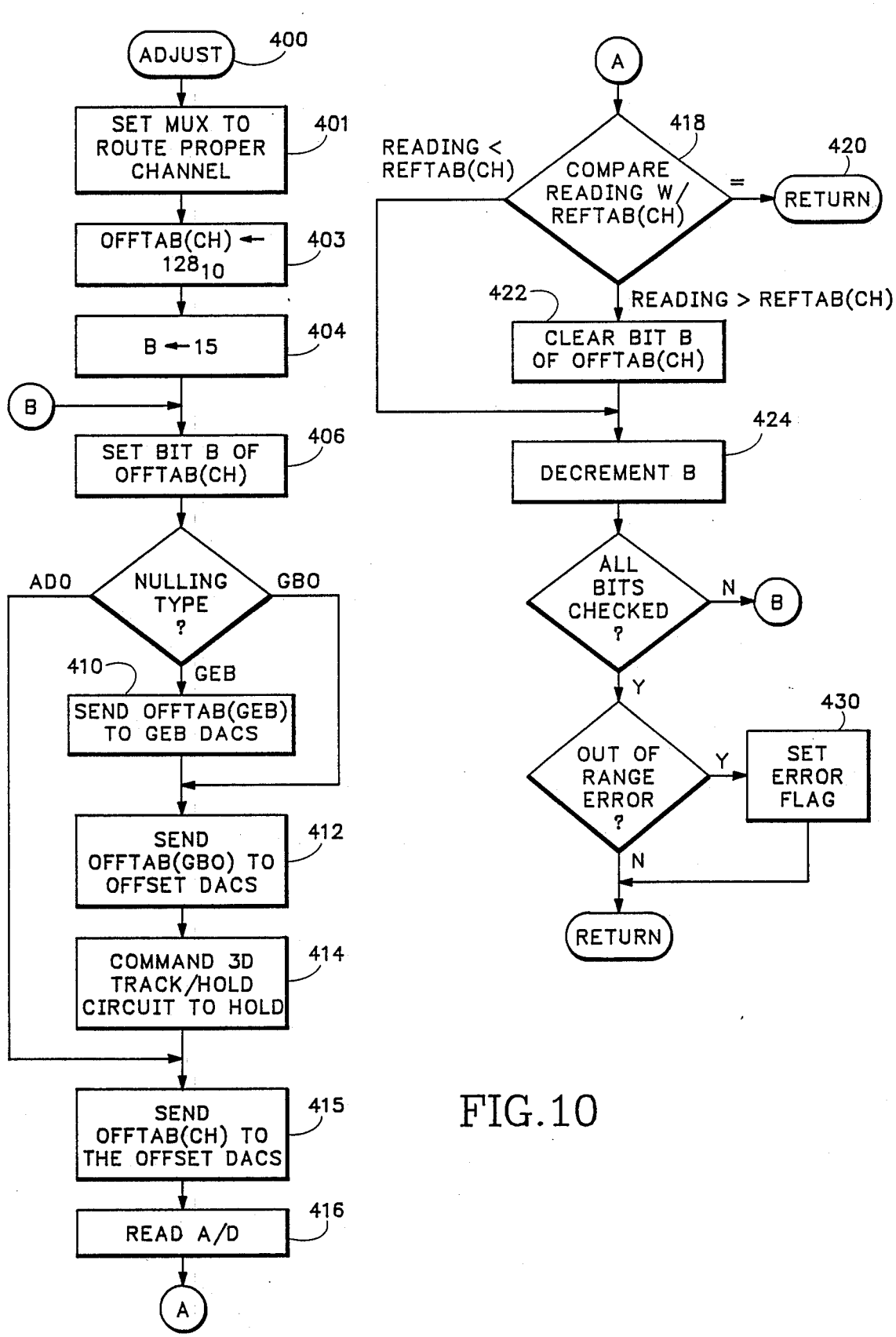
FIG. 10 is a flow diagram of a nulling routine, ADJUST.

The main processor 116 executes the same stored program ADJUST routine 400 shown in the flow diagram of FIG. 10, steps 344, 364, 368, and 378 of the GEB routine 360. ADJUST 400 is a nulling routine, that is, a routine the main processor 116 executes to set the digital inputs of DACs 64, 66, 102 and 104, as necessary, so that the signal output of the third summing amplifier 86, and thus the digital output of the A/D converter 96, is zero.

The main processor 116 can perform one of three types of nullings during each execution of the routine ADJUST 400. The first type is analog/digital offset nulling, or ADO nulling of a selected signal. The main processor 116 performs ADO nulling when ADJUST is passed the parameters "ADO:CH" where CH can be the name of an input signal provided to the MUX 82. The MUX channel to be nulled is placed after the colon in the parameters. When performing ADO nulling by executing ADJUST 400, the main processor 116 adjusts the digital inputs of the offset system DACs 102 and 104 so that the signal output of the fourth summing amplifier 106, when added to the signal output of the MUX 82 at the third summing amplifier 86, equals zero. The MUX 82 has 7 used input channels; the main processor 116 processor can ADO null any of the seven signals. The main processor 116 stores the resulting setting of the offset system DACs 102 and 104 in the OFFTAB memory register associated with the MUX channel nulled.

The second type of nulling is ground balance offset nulling, or "GBO" nulling. The main processor 116 performs GBO nulling when ADJUST 400 is passed the parameter GBO. When performing GBO nulling, the main processor 116 commands the MUX 82 to route the GD signal to the third summing amplifier 86. The main processor 116 then adjusts the digital inputs of the offset system DACs 102 and 104 so that the signal output of the third summing amplifier 86 is zero. The main processor 116 stores the resulting settings in OFFTAB(GBO). Unlike during analog/digital offset nulling, in ground balance offset nulling the main processor 116 holds constant the signal that the fourth summing amplifier 106 provides to the third summing amplifier 86. The main processor 116 then adjusts the signal held by the third track/hold circuit 108. Since in reality the signal input to the third track/hold circuit 108 is identical to the input signal provided to the third summing amplifier 86, adjusting the signal held by the third track/hold circuit 108 is a three step process. The main processor 116 first sets the offset system DACs 102 and 104 to the settings required to produce a desired signal for the third track/hold circuit 108. The main processor 116 then commands the third track/hold circuit 108 to hold. The main processor 116 then sets the offset system DACs 102 and 104 back to their original settings.

The third type of nulling is ground exclusion balance nulling, or "GEB" nulling. The main processor 116 performs GEB nulling when ADJUST 400 is passed the parameter GEB. When performing GEB nulling, the main processor 116 commands the MUX 82 to route the GD input channel signal to the output of the MUX 82. The main processor 116 then adjusts the digital inputs of the GEB system DACs 64 and 66, as discussed below, so that the signal output of the third summing amplifier 86 is zero. The main processor 116 stores the resulting digital inputs for the DACs 64 and 66 in the OFFTAB(-GEB) memory register.

Referring to FIG. 10, in the ADJUST routine 400, the main processor 116 first commands the MUX 82 to route the proper MUX input channel, step 401. For ADO nulling, the proper channel is the input channel that receives the signal desired to be nulled. For GBO and GEB nullings, the proper MUX input channel is GD. The main processor 116 then stores the digital value 128 in the OFFTAB memory register having the name corresponding to the name of the parameter nulled, OFFTAB(CH), step 403. The main processor 116 then performs an iterative binary search for the correct digital inputs to provide to the DACs.

Starting with the most significant bit, at step 404, the main processor 116 sets a single bit of the value of OFFTAB(CH) in step 406. For ADJUST(GEB) nulling, the main processor 116 sends the value in OFFTAB(GEB) to the GEB system DACs 64 and 66, in step 410. For both GEB and GBO nullings, the main processor 116 sends the value in OFFTAB(GBO) to the offset system DACs 102 and 104 and commands the third track/hold circuit 108 to hold in steps 412 and 414. The main processor 116 then sends the value in OFFTAB(CH) to the offset system DACs 102 and 104 in step 415 and reads the output of the A/D converter 96 in step 416. In step 418 the main processor 116 compares the output of A/D converter 96 with the value in the memory register for the channel being adjusted REFTAB(CH). If the value read from the A/D converter 96 is equal to the value in REFTAB(CH), then the adjustment is correct and the main processor 116 exits routine ADJUST at step 420. If the reading is smaller then the value in REFTAB(CH), then the bit just set in OFFTAB(CH) during the most recent iteration of step 403 is cleared in step 422. If each single bit in OFFTAB(CH) has been checked, the main processor 116 checks the resulting value in OFFTAB(CH). If the value is too large, indicating too large an offset was needed to null the channel, the main processor 116 sets an error flag in step 430. If the main processor 116 has not set and checked each bit in OFFTAB(CH), it selects the next bit as step 424 and sets it as step 406.

2. Metal Detection (Search) Operation

Figure 11:
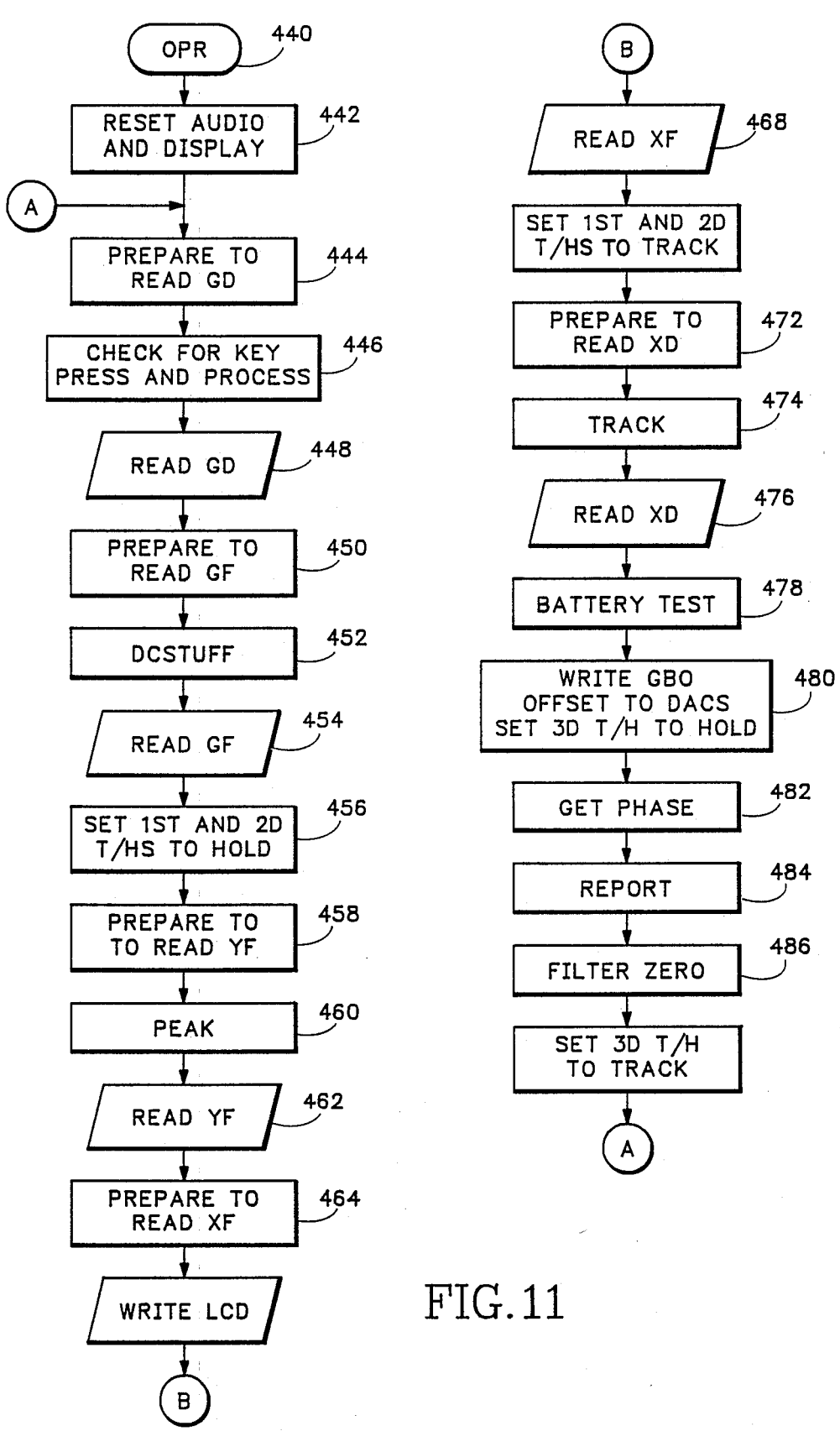
FIG. 11 is a flow diagram of a main loop routine, OPR.

The main stored program routine executed by the main processor 116, called OPR 440, is shown in the flow diagram of FIG. 11. The main processor 116 begins executing OPR 440 after completing the execution of step 386 in routine GEB 360, shown in FIG. 9, or whenever the trigger switch 122 is toggled. Thereafter, at step 442 the main processor 116 resets the LCD 138 and executes ADJUST 400, shown in FIG. 10, passing the parameters ADO:GD. The main processor 116 then performs a loop, starting at step 444, about 100 times each second. During each execution of the loop, the main processor 116:

(a) Reads the outputs of the A/D converter 96 for signals GD in steps 444 and 448, GF in steps 450 and 454, YF in steps 464 and 468, XF in steps 458 and 10 462, and XD in steps 472 and 476.

(b) Calculates from the GD reading the tabulated depth of any target sensed, in step 452;

(c) Calculates from the GD reading a number called GOUT based on the user selected sensitivity setting, also in step 452;

(d) Detects peaks in the GF channel, in step 460;

(e) Changes, if necessary, the value in OFFTAB(-GEB), the ground balance setting, to match current ground mineralization conditions, in step 474;

(f) Tests the condition of the battery 148, in step 478;

(g) Checks for and processes any keypresses on the keypad 120 or trigger switch 122, in step 446;

(h) Updates the signal held by the third track/hold circuit 108, in step 480;

(i) Determines the phase number of the receive signal from the XF and YF readings, in step 482;

(j) Updates the LCD 138 and instructs the I/O processor 118 regarding the output of the speaker 126, in step 484; and (k) Nulls variations in the GF, XF, and YF readings caused by imperfectly balanced coil assembly 30 or operational amplifier offset drift in step 486.

The order of execution is controlled by time constraints and the necessity of reading a signal's value before calculating another value based on the reading. Before reading the XF and YF channels, the main processor commands the track/hold circuits 50 and 52 to hold, as step 456. Thus, the XF and YF signal readings are from signals that occurred at the same instant in time.

Figure 12:
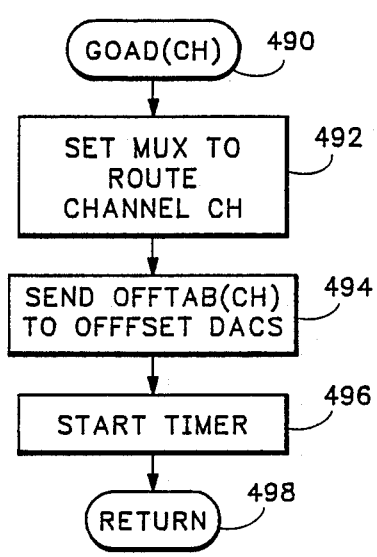
FIG. 12 is a flow diagram of a routine, GOAD, that prepares the metal detector circuit for reading the values of each input signal to be provided to the analog-to-digital converters.

Reading each signal is a two-part process. The first part, a stored program routine named GOAD(CH) 490, where "CH" represents the name of the input signal to MUX 82 to be read, is shown in the flow diagram of FIG. 12. The GOAD(CH) routine 490 is executed by the main processor 116 during each of steps 444, 450, 458, 464, and 472 of the routine OPR 440 shown in FIG. 11. In executing GOAD(CH), the main processor 116 commands the MUX 82 to route the selected signal CH to its output pin, step 492. The main processor 116 then sends the value stored in memory register OFFTAB(CH) to the offset system DACs 102 and 104, step 494, and starts countdown in the on-chip hardware timer 136, step 496. The main processor 116 must wait for switching transients to die down in the analog portion c,f the circuitry before reading the output of the A/D converter 96. Because the counter 136 is hardware, not software, the main processor 116 may execute other routines while waiting for the countdown to end. The main processor 116 then returns to executing the next step in OPR 440, step 498.

Figure 13:
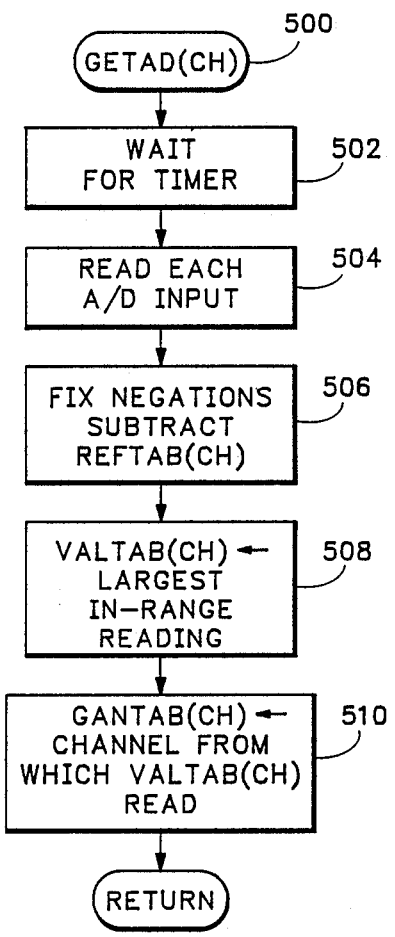
FIG. 13 is a flow diagram of a routine, GETAD, that reads the output signals from analog-to-digital converter.

The second part of reading each signal, execution of a stored routine named GETAD(CH), indicated generally by the reference number 500, is shown in the flow diagram of FIG. 13, where "CH" is the name of the signal to be read. The GETAD(CH) routine 500 is executed by the main processor 116 in each of steps 448, 454, 462, 468, and 476 shown in FIG. 11. In executing GETAD(CH) 500, the main processor 116 waits, step 502, for the countdown of the on-chip counter 136 to end. The main processor 116 then commands the A/D converter 96 to convert each of its four inputs to binary coded digital form, which the main processor 116 reads in step 504. The main processor 116, in step 506, fixes the negations in the readings caused by the negative gains of the third summing amplifier 86 and scaling amplifiers 90, 92, and 94 and then subtracts the value stored in REFTAB(CH) from reading the signal output of the fourth scaling amplifier 94. The main processor 116 stores the value of the largest magnitude reading from step 506 that is within the input range of A/D converter 96 in memory register VALTAB(CH), in step 508, and stores the number of the A/D input channel associated with that reading in memory register GANTAB(CH), in step 510. The main processor 116 then returns to executing the main loop of routine OPR 440 in FIG. 11.

Before the main processor 116 uses the values stored in the VALTAB and the associated GANTAB memory registers, it converts them to a single 8-bit number using a piecewise, linear, compression scheme described below. This 8-bit number is the "reading" of the signal read. The main processor 116 executes the routine BYTE 520, shown in the flow diagram of FIG. 14, to convert the values stored in GANTAB and the associated VALTAB memory registers into an 8-bit number for any of the six pairs of VALTAB and GANTAB memory registers. Upon entry of the BYTE routine 520, the main processor 116, at steps 522 and 524, sets a NEGATIVE flag if the value stored in the VALTAB(CH) memory register is negative, where "CH" is a name of MUX input signal. The main processor 116 then stores in a memory register "A" the absolute value of VALTAB(CH), step 526. If the value stored in GANTAB(CH) is 3, that is, if the value in VALTAB(CH) is the result of the signal output of the fourth scaling amplifier 94, then the main processor 116 continues execution at step 530. If the value stored in register A is not less than 25, the main processor 116 calculates one-fourth the value stored in A, adds 18 to the resulting value and stores the sum in memory register A, as shown in step 532. The main processor 116 then continues execution at step 548, which will be described in more detail below.

If the value stored in GANTAB(CH) is 2, signifying the value in VACTAB(CH) is the result of the signal output of the third scaling amplifier 92, then the main processor 116 calculates one-fourth the value stored in A, adds 43 to it, and stores the sum back in memory register A as steps 534 and 536. The main processor 116 then continues execution at step 548.

If the value stored in GANTAB(CH) is 1, signifying the value in VACTAB(CH) is the result of the signal output of the second scaling amplifier 90, then the main processor 116 calculates one-fourth the value stored in A, adds 68 to it, and stores the sum back in memory register A as steps 538 and 540. The main processor 116 then continues execution at step 548.

If the value stored in GANTAB(CH) is 0, signifying the value in GANTAB(CH) is the result of the signal output of the first scaling amplifier 88, then the main processor 116 determines whether VALTAB(CH) is greater than 49, as step 542. If the value is greater than 49, then the main processor 116 calculates one-eighth the value stored in A, adds the value 111 (base 10) to it and stores the sum back in memory register A as step 546. If the value is less than 49, then the main processor 116 calculates one-half the value stored in A, adds 93 to it and stores the resulting sum back in memory register A as step 544. The main processor 116 then continues execution at step 548.

As step 548, the main processor 116 checks whether the NEGATIVE flag is set. If so, the main processor 116 negates the value stored in A as step 550. The main processor 116 then exits the routine BYTE 520, returning to the calling routine as step 552.

Figure 14:
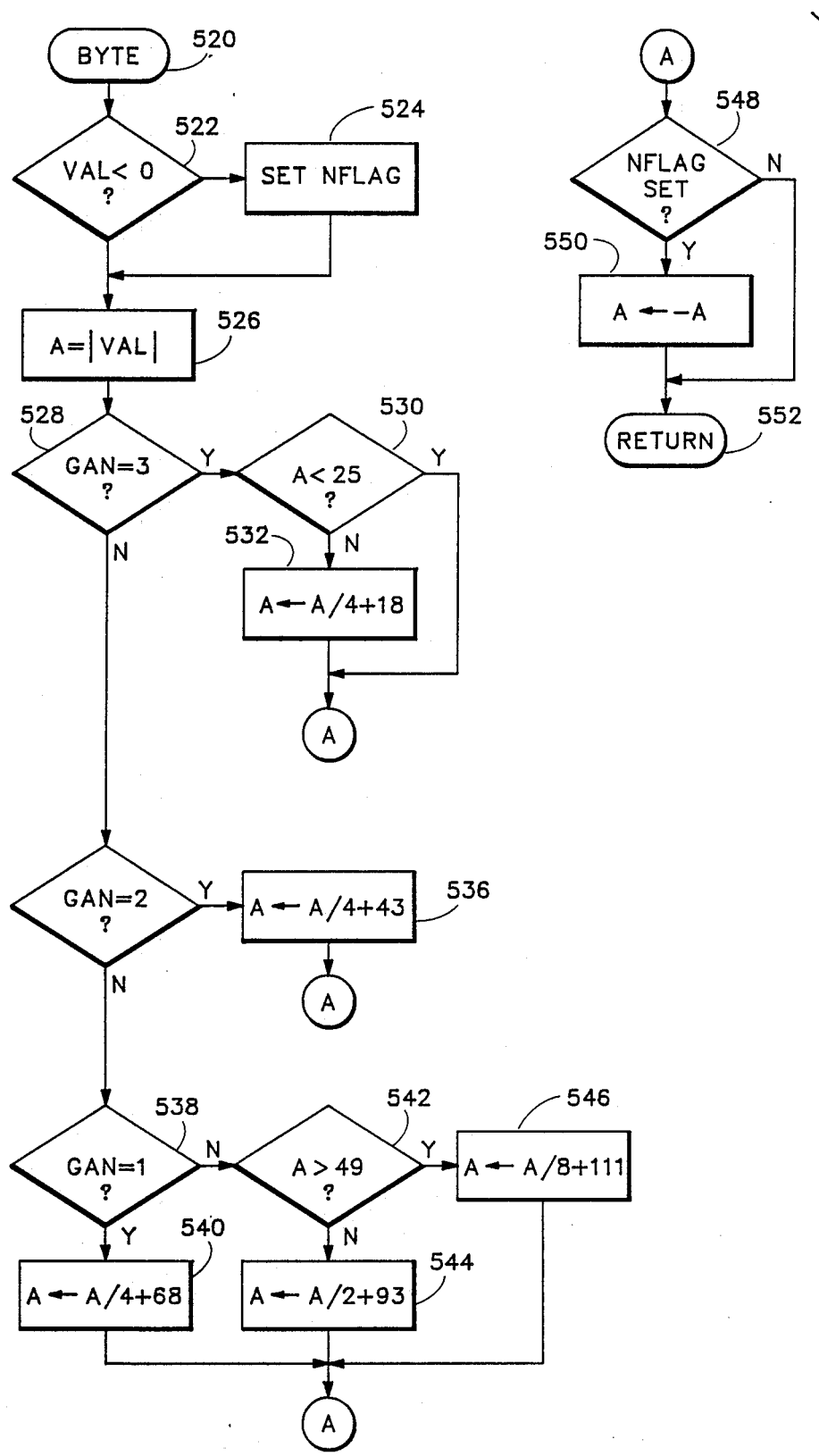
FIG. 14 is a flow diagram of a routine that converts the readings from the analog-to-digital converter to 8-bit binary numbers.
Figure 15:
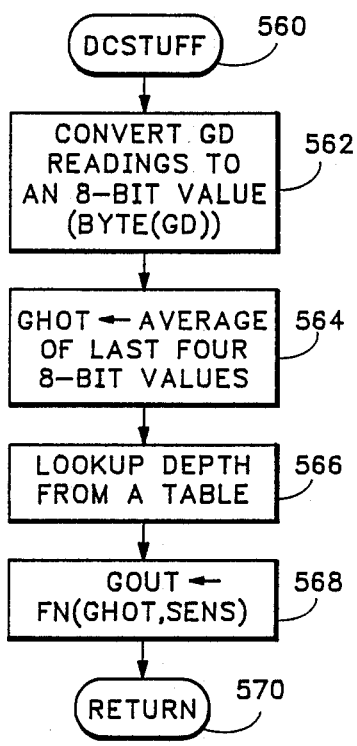
FIG. 15 is a flow diagram of the routine DCSTUFF.

At step 452 in OPR 440 in FIG. 11, the main processor 116 executes a stored program routine DCSTUFF, indicated by the reference number 560 and shown in flow diagram form in FIG. 15. As step 562, the main processor 116 converts VALTAB(GD) and GANTAB(GD) into an 8-bit number by executing the routine BYTE 520, shown in FIG. 14 and described previously. The main processor 116 then stores in a memory register GHOT an average of the last four of such 8-bit numbers as step 564. From this average, the main processor 116 determines a depth value derived for coin-sized metallic objects from a table of values located in ROM 132 and stores the depth value in a memory register named DEPTH, step 566. The main processor 116 calculates a value as a function of the value in GHOT and the user selected sensitivity setting and stores it in the memory register GOUT, step 568. As step 570, the main processor 116 then returns to OPR at step 452.

Figure 16:
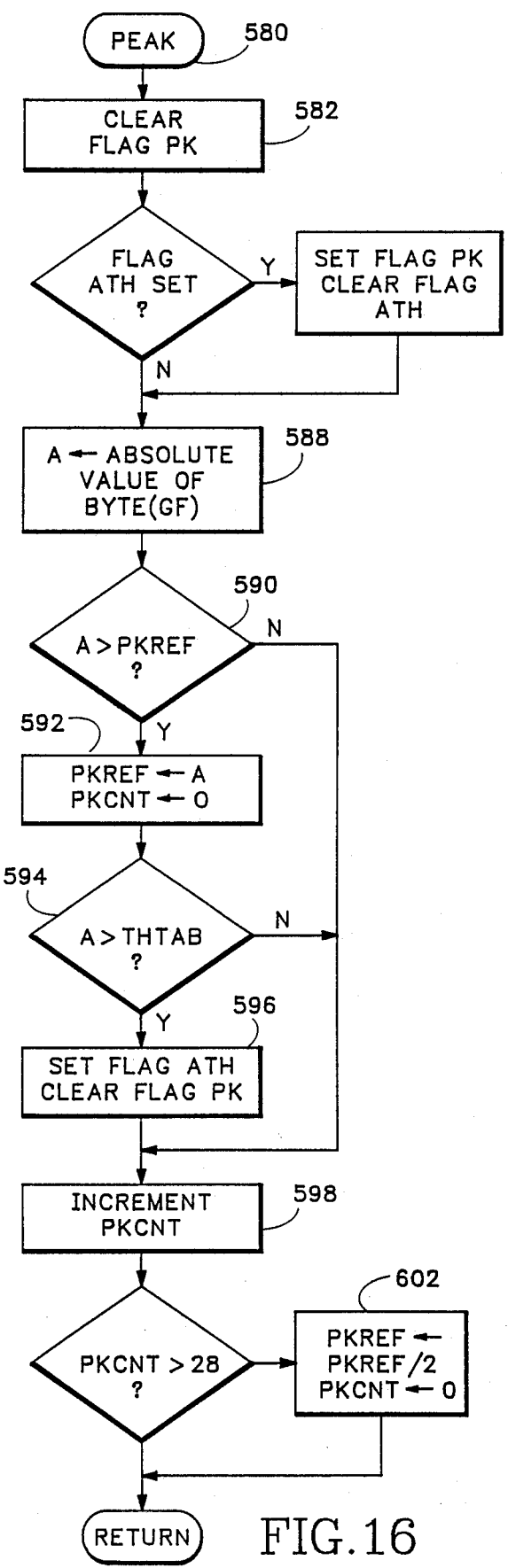
FIG. 16 is a flow diagram of the routine PEAK.
Figure 17:
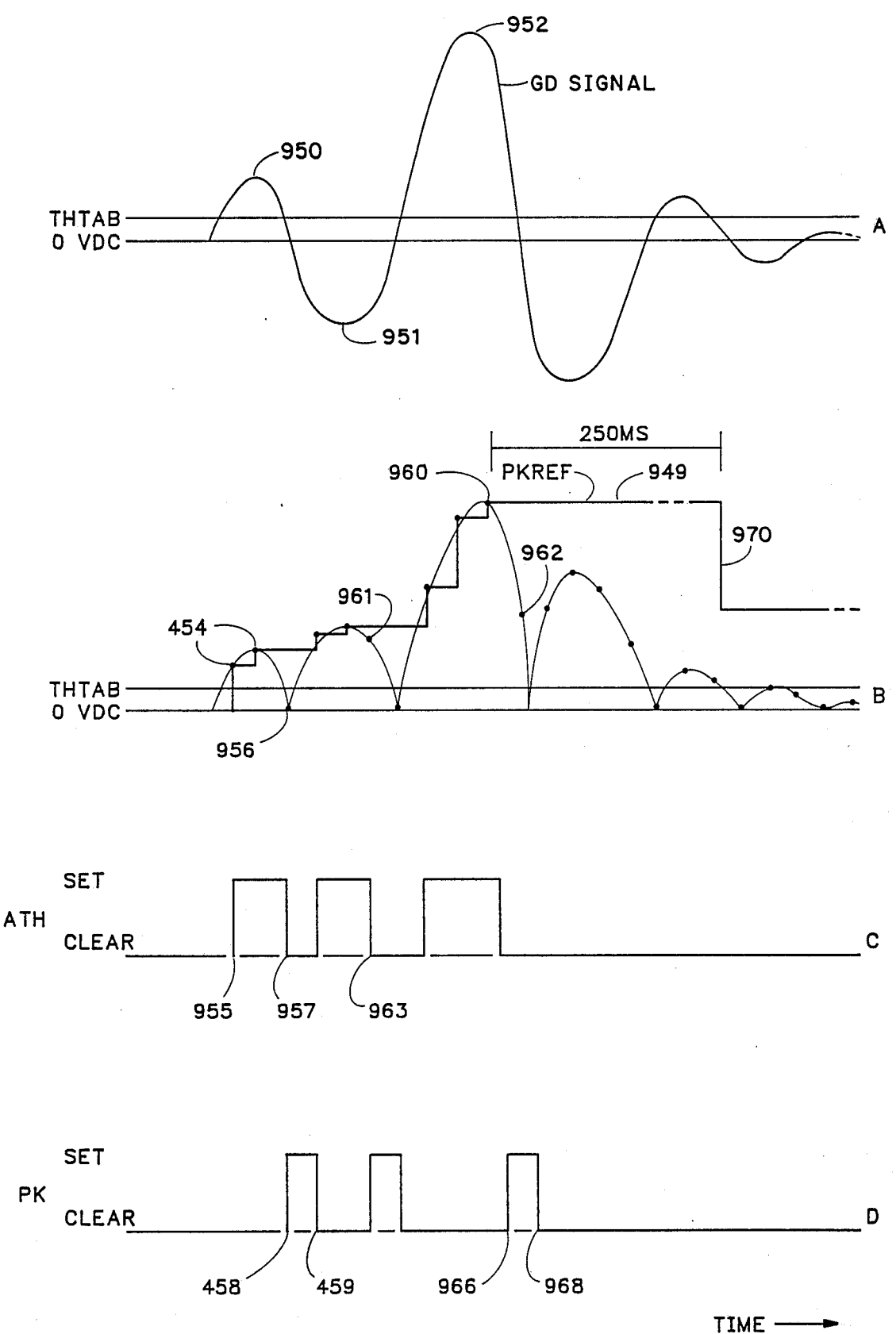
FIG. 17 is a waveform and simultaneous state diagram of selected analog and digital signal values within the metal detector disclosed.

The first, second and third bandpass filters 42, 46, and 74 have ringing frequencies of approximately 15 HZ. When their ringing peaks, the main processor 116 can calculate the phase angle of the receive signal with maximum accuracy. FIG. 17 shows the impulse response of the second bandpass filter 46. When executing the stored program routine PEAK 580, shown in flow diagram form in FIG. 16 and executed in step 460 of OPR, shown in FIG. 11, the main processor 116 sets a flag PK whenever the GF signal reading peaks. The main processor 116 also sets another flag, ATH, whenever the GF channel reading exceeds both a threshold value named THTAB and a value stored in the memory register PKREF.

Figure 19:
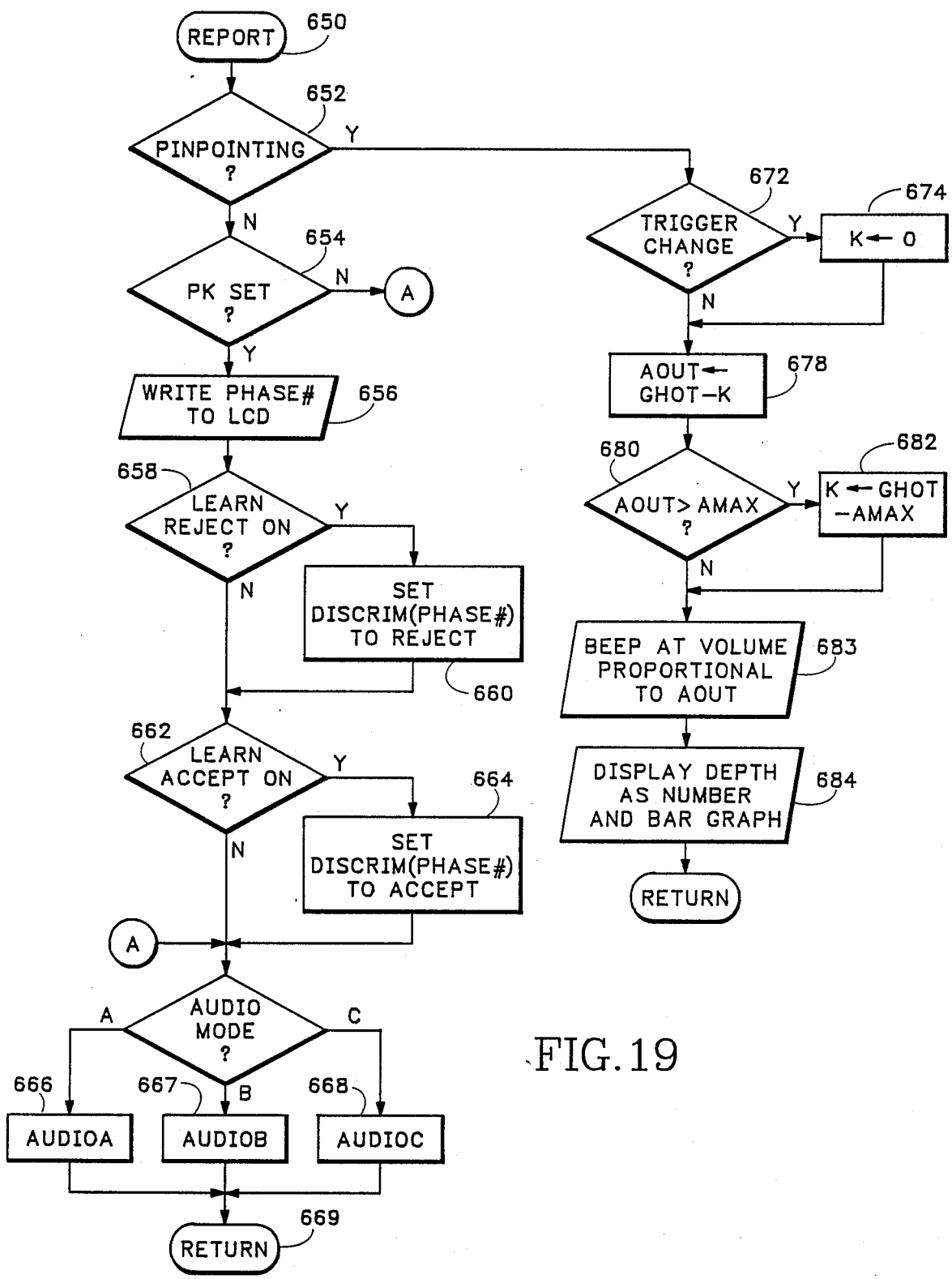
FIG. 19 is a flow diagram of an output routine, REPORT.

Examining routine PEAK 580 in more detail, the main processor 116 converts to an 8-bit number the values stored in VALTAB(GF) and GANTAB(GF) by executing the routine BYTE shown in FIG. 14. The main processor 116 then calculates the absolute value of the 8-bit number and stores the result in memory register A. If the value stored in A is greater than the previous largest value from register A, stored in memory register PKREF, then the main processor 116 copies the value in A to the PKREF memory register, steps 590 and 592. If the value in A is also greater than a predetermined threshold value THTAB, then the main processor 116 also sets flag ATH, steps 594 and 596. The main processor 116 uses the flag ATH when executing the routine REPORT 650, shown in FIG. 19.

Memory register PKCNT holds a count value which the main processor 116 resets to zero each time the value in A is greater than the value in PKREF, step 592, and increments the count value, step 598, each time it executes the routine PEAK 580. When PKCNT exceeds 28, the main processor 116 divides the value in PKREF by two and resets PKCNT to zero, step 602. In this manner, the main processor 116 halves the value in PKREF approximately four times per second, allowing detection of lower GF peaks after a time.

The main processor 116 clears flag PK upon beginning the execution of routine PEAK 580, step 582. Then, if flag ATH is set, the main processor 116 sets flag PK and clears flag ATH. Flag PK remains set unless the main processor 116 sets flag ATH in step 596, at which time the main processor 116 also clears flag PK. Flag PK will remain set after the main processor 116 completes execution of routine PEAK 580 only in the first instance the value stored in memory register A does not exceed PKREF. The main processor 116 checks the status of flag PK when executing the routine REPORT 650, FIG. 19, which will be described below.

Referring to FIG. 17, row A, the impulse response of the second bandpass filter 46 is shown as a function of time. Row B shows the absolute values of the GF readings and the values stored in PKREF at corresponding times. Rows C and D show the status of flags ATH and PK, respectively, also for the same time period shown in row A. The GF signal reaches extremes at points 950, 951 and 952. It is at these points that the phase angle of the receive signal can be calculated with the most accuracy. The points 954 in row B represent the values stored in memory register A in step 588, (FIG. 16). When these points are larger than the value THTAB and larger than PKREF, then flag ATH is set, as at point 955. When the value in A is less than the value THTAB, as shown at point 956, or less than PKREF, as shown by point 961, then flag ATH is cleared, as at points 957 and 963. When the main processor 116 clears flag ATH, it sets flag PK, such as shown at 958 and 966, which remains set until the next execution of routine PEAK 580, such as shown at 959 and 968. Notice that flag PK may in some cases be set when the GF signal has already dropped considerably below the peak as at point 962.

PEAKREF contains the largest reading of GF and is shown as the solid line 949. If the value in PEAKREF never decreased, after detecting a large maximum peak such as signified by point 960, smaller peaks would not be detected. To avoid this problem, the value in PKREF is divided by two approximately four times each second, as shown at 970. In this manner, smaller peaks may be detected after a time.

Figure 18:
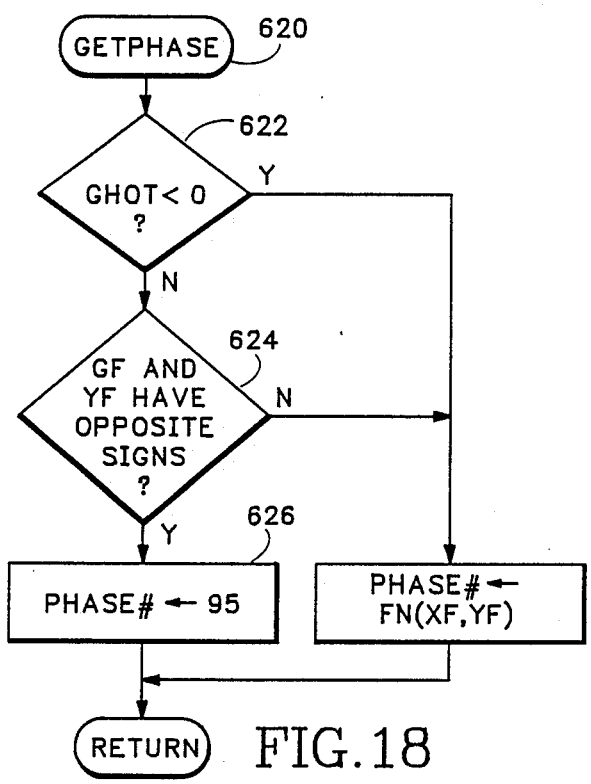
FIG. 18 is a flow diagram of a phase calculation routine, GETPHASE.

The main processor 116 calculates the phase angle of the receive signal with respect to the detection axes of the X and Y phase detectors 38 and 40 when executing the stored program routine GETPHASE 620, shown in flow diagram form in FIG. 18 and called in step 482 of the routine OPR 440 in FIG. 11.

When executing the stored program routine named GETPHASE 620, in step 482 of the routine OPR 440 of FIG. 11, and shown in more detail in the flow diagram of FIG. 18, the main processor 116 calculates the phase angle of the receive signal. It then determines which phase number corresponds to the calculated phase angle. The bandpass filters 42, 46, and 74 can sometimes invert their respective input signals. When this inversion occurs, deep quarters and rocks having a different mineralization than the surrounding soil ("hot rocks") can cause similar signals. If GOUT, which is the average of the last four GD channel readings, is positive, as in step 622, and if GF and YF have opposite polarities, as i step 624, then the detected object is a deep quarter, not a hot rock, and the main processor 116 sets the phase number to 95, step 626. Otherwise, the main processor 116 performs the phase calculation normally as a function of the XF and YF channel readings.

The main processor 116 executes the stored program routine REPORT 650 in step 484 of routine OPR 440, FIG. 11. REPORT 650 is shown in more detail in the flow diagram of FIG. 19. In executing REPORT 650, the main processor 116 updates the LCD 138 and sends sound commands to the I/O processor 118. Upon entry of REPORT 650, the main processor 116 checks the condition of the trigger switch 112 as step 652. If the trigger switch 122 is in the ON position, the metal detector is in the pinpoint mode, which will be discussed subsequently. If the trigger switch 122 is OFF, the main processor 116 checks the state of flag PK as step 654. If flag PK is set, the main processor 116 displays the phase number calculated in routine GETPHASE, FIG. 18, using digital display 248 on the LCD 138 as step 656. The state of the DISCRIMINATE(PHASE#) memory register may be changed in steps 658, 660, 662 and 664 as will be discussed in more detail below. The main processor 116 then executes one of three audio output routines 666, 667 or 668, depending on the current audio mode setting.

Figure 20:
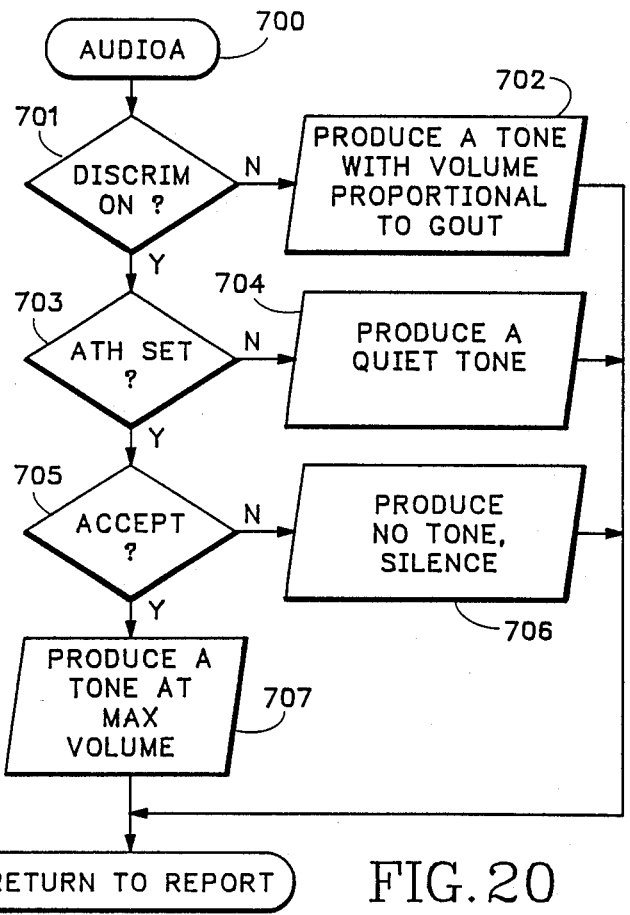
FIG. 20 is a flow diagram of an audio mode routine AUDIOA.

The user may select different audio modes using the keypad 120, causing the metal detector to produce different accept and reject indications. Three audio modes, each with discriminate mode either on or off yields six possible audio responses. The first audio mode, produced by routine AUDIOA, indicated by reference numeral 700 in FIG. 20, emulates a typical metal detector having only analog circuitry. If the discriminate mode is off, the main processor 116 commands the I/O processor 118 to produce a tone with volume proportional to the value stored in the GOUT memory register, at steps 701 and 702. Otherwise, if flag ATH is not set, at steps 703 and 704, the main processor 116 commands the I/O processor 118 to produce a low-amplitude constant frequency tone indicating that no target is being detected. If flag ATH is set and DISCRIMINATE(PHASE#) contains an ACCEPT code, where PHASE# is the phase number calculated in routine GETPHASE 620 (FIG. 18), then the main processor 116 commands the I/O processor 118 to produce a tone at the user-selected maximum volume, steps 705 and 707. Otherwise, no sound is produced, step 706. When the main processor 116 finishes executing routine AUDIOA 700, it returns to routine REPORT 650, FIG. 19.

Figure 21:
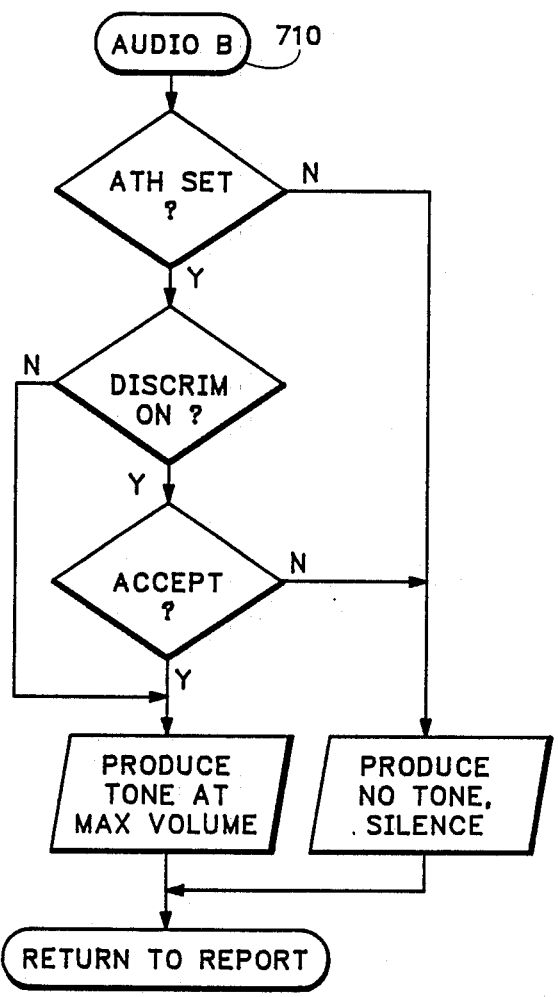
FIG. 21 is a flow diagram of an audio mode routine AUDIOB.

The routine AUDIOB, shown at 710 in FIG. 21, is very similar to AUDIOA 700. The main processor 116 commands the I/O processor 118 to produce a tone under two circumstances: either when discriminate mode is off and flag ATH is set; or when flag ATH is set, discriminate mode is on, and DISCRIMINATE(PHASE#) contains an ACCEPT code (where PHASE# is the phase number calculated in routine GETPHASE 620). If neither of these two conditions is met, no sound is produced. When the main processor 116 finishes execution of routine AUDIOB 710, it returns to execution of routine REPORT 650, FIG. 19, at step 669.

Flag ATH is set when the GF channel output is both increasing and greater than a minimum threshold. Since the GF channel is bandpass filtered, DC and low frequency signals are filtered out. If the coil assembly 30 is swept across the ground too slowly, the GF channel output will change too slowly, and bandpass filter 46 will keep the GF channel output below the minimum threshold required to set flag ATH, despite presence of an acceptable target. Because of this constant motion requirement, modes of operation that check flag ATH are called "motion discriminate" modes.

Figure 22:
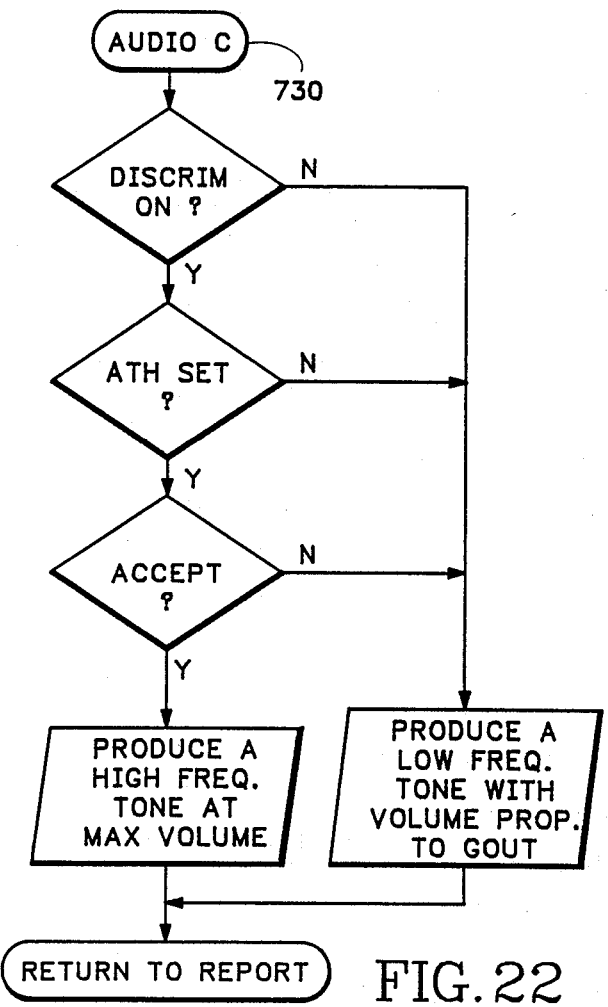
FIG. 22 is a flow diagram of an audio mode routine AUDIOC.

When executing routine AUDIOC, shown at 730 in FIG. 22, the main processor 116 combines a motion discriminate audio response with a typical non-discriminate audio response. If discriminate mode is on and flag ATH is set, and the DISCRIMINATE(PHASE#) memory register contains an ACCEPT code, then the main processor 116 commands the I/O processor 118 to produce a higher frequency tone from the speaker 126 at a volume proportional to the value stored in GOUT. If any of the just-mentioned conditions is not met, the main processor 116 commands the I/O processor 118 to produce a lower frequency tone having a volume proportional to the value stored in GOUT. To differentiate between accept and reject tones, the accept tone has a higher frequency. In audio mode C, all metals cause a tone to be produced. If the DISCRIMINATE(-

PHASE#) memory register contains an ACCEPT code, then a high frequency tone is sounded if a target of that composition is detected. If the DISCRIMINATE(PHASE#) memory register contains a REJECT code, or the user is moving the loop assembly too slowly, a low frequency tone is sounded. Audio mode C thus allows the user to detect all metal, yet discriminate at the same time.

If the trigger switch 122 is in the ON position at step 652 of the REPORT routine 650, the metal detector 10 is in the pinpoint mode. Therefore, the main processor 116 continues execution of the REPORT routine 650 at step 672. The main processor 116 calculates a value AOUT by subtracting a value stored in memory register "K," from the value in GHOT, step 678. The value in register K is set to zero every time the trigger switch 122 changes positions, steps 672 and 674. If AOUT is greater than a predetermined value AMAX, which corresponds to the maximum volume of the speaker 126, the main processor 116 stores in register K the value which is the result of subtracting the value AMAX from the value stored in GHOT, steps 680 and 682. The main processor 116 then commands the I/O processor 118 to produce a tone having a volume corresponding to the value AOUT, step 683. The main processor 116 also displays a bar graph using display blocks 254 (FIG. 4), activating a number of display blocks 254 corresponding to the value stored in AOUT, step 684. The main processor 116 then returns to executing the routine REPORT (FIG. 11) at step 486.

The DISCRIMINATE memory registers may be set to signify ACCEPT or REJECT using any of three methods. The first method is set in step 342 of routine ONKEY 320, FIG. 8. Each time the metal detector is turned on, the user is given the opportunity of having the DISCRIMINATE registers set to a pre-programmed general purpose configuration. In this general purpose configuration, coins and precious metals are detected while iron and aluminum are ignored.

The second method allows the user to set DISCRIMINATE registers corresponding to an actual sample. The user presses either the LEARN ACCEPT or LEARN REJECT switch 206, 208. These keypresses are processed in step 446 of OPR 440 FIG. 11. If either of the LEARN ACCEPT or LEARN REJECT switches 206, 208 is pressed, the main processor 116 sets a flag designating the proper learn mode, and jumps to the beginning of routine OPR 440, FIG. 11. The user then passes the coil assembly 30 over a target sample. Returning to routine REPORT 650, FIG. 19, when flag PK is set, the main processor 116 in steps 658 and 662 determines whether either learn mode has been selected, and if a learn mode has been selected, sets the DISCRIMINATE memory register indexed by the calculated phase number to ACCEPT, step 664, or REJECT, step 660 as appropriate. In this manner, a user may teach the metal detector to accept or reject targets based on actual samples.

Figure 23:
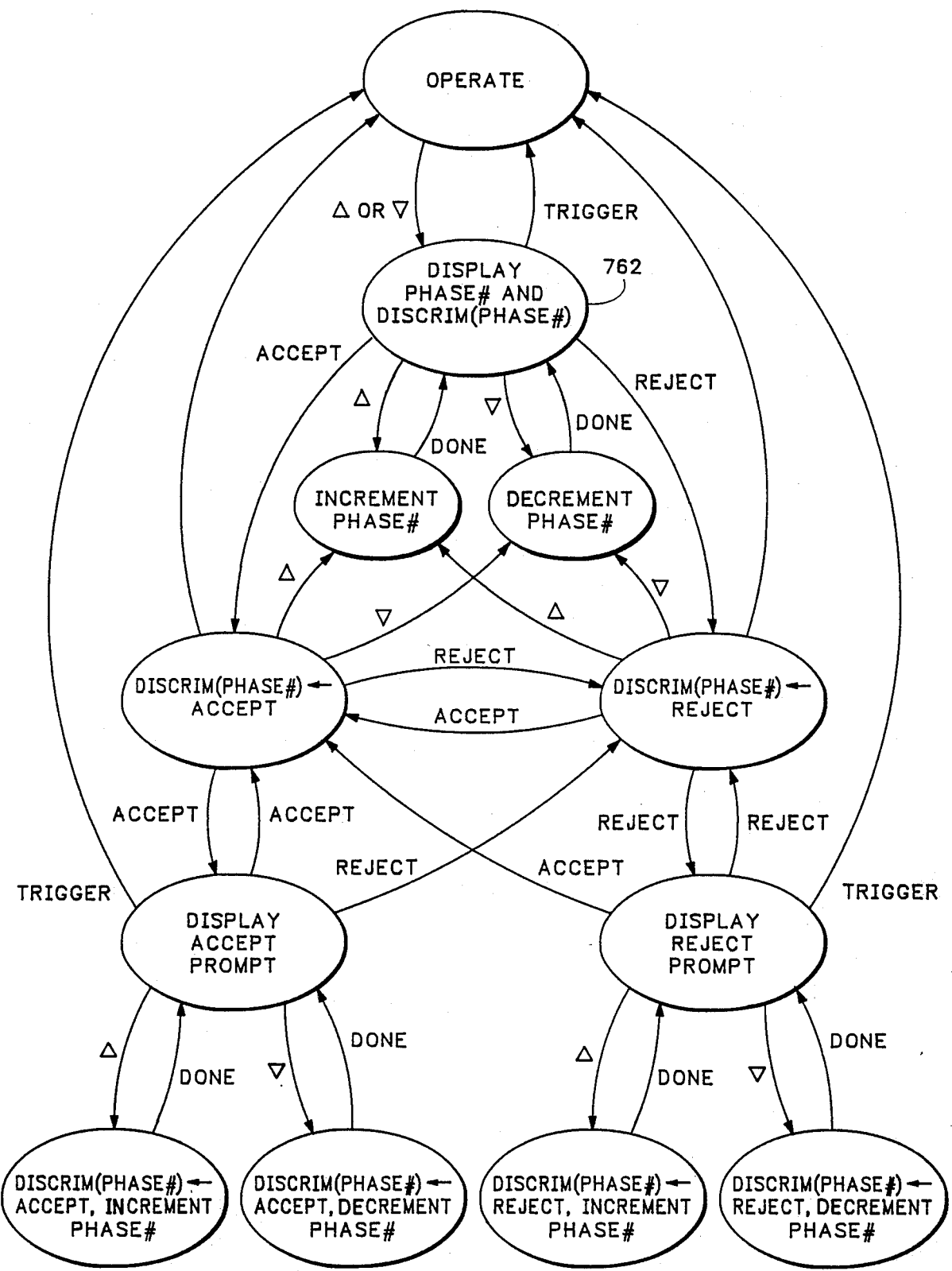
FIG. 23 is a state diagram of a DISCRIMINATE memory register editing routine, EDIT.

The third method of changing the DISCRIMINATE memory registers allows the user to set each register individually. This routine, called EDIT, is executed by the main processor 116 in step 446 of OPR 440, FIG. 11, and is shown as a state diagram in FIG. 23. In FIG. 23, use of a particular control switch is indicated by the respective switch symbol appearing alongside a transition arrow between states. EDIT involves the use of the switches EDIT UP 222, EDIT DOWN 220, LEARN ACCEPT 206, and LEARN REJECT 208. If either of the EDIT UP 222 or EDIT DOWN 220 switches is pressed, the main processor 116 displays a phase number (PHASE#) and the contents of the corresponding DISCRIMINATE memory register, i.e. DISCRIMINATE(PHASE#). The user may then press any of the four switches or the trigger switch. If the user presses either of the EDIT UP or EDIT DOWN switches, the main processor 116 increments or decrements the value PHASE# and returns to state represented by block 762. If the user presses either of the LEARN ACCEPT 206 or LEARN REJECT 208 switches, the main processor 116 stores in the DISCRIMINATE(PHASE#) memory register a code signifying either ACCEPT or REJECT. At any time, operating the trigger switch 122 causes the main processor 116 to return to normal search operation by returning to the main operation loop routine OPR 440, shown in FIG. 11.

Rather than having to press the LEARN ACCEPT 206 and then EDIT UP 222 switches repeatedly to set a contiguous block of DISCRIMINATE memory registers, another option is available. After entering the edit mode, the user presses either of the LEARN ACCEPT 206 or LEARN REJECT 208 switches twice. An ACCEPT or REJECT prompt 206A or 208A (FIG. 4), is displayed 206A or 208A, FIG. 4. All DISCRIMINATE phase number memory registers can then be sequentially displayed and automatically set to ACCEPT or REJECT. The user presses the EDIT UP 222 or EDIT DOWN 220 switches to display adjacent larger or smaller phase numbers. This "block edit" mode can be exited by pressing the LEARN ACCEPT switch 206, LEARN REJECT switch 208, or trigger switch 122.

Figure 24A:
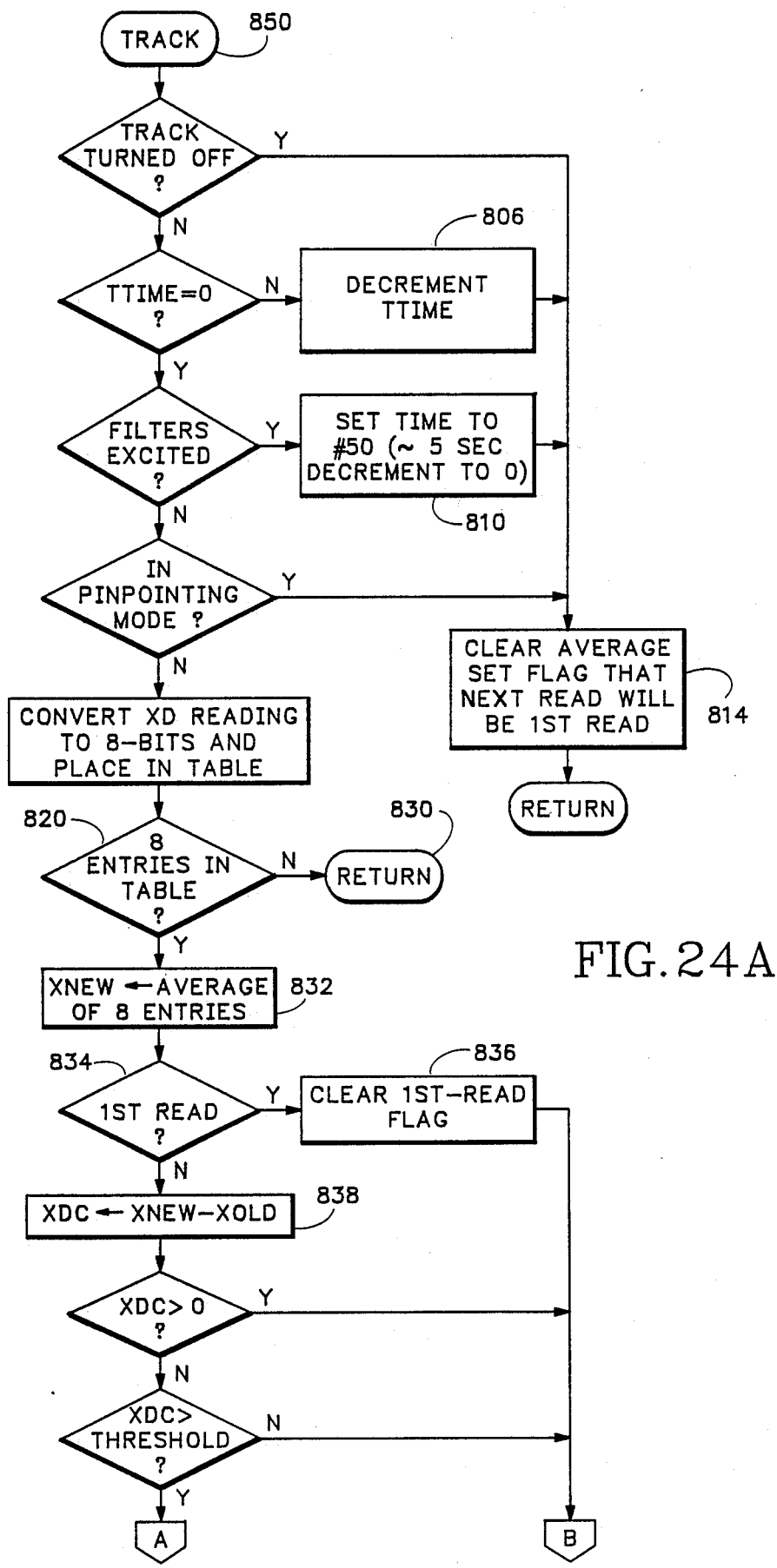
FIGS. 24A and 24B show a flow diagram of a ground exclusion balance tracking routine, TRACK.
Figure 24B:
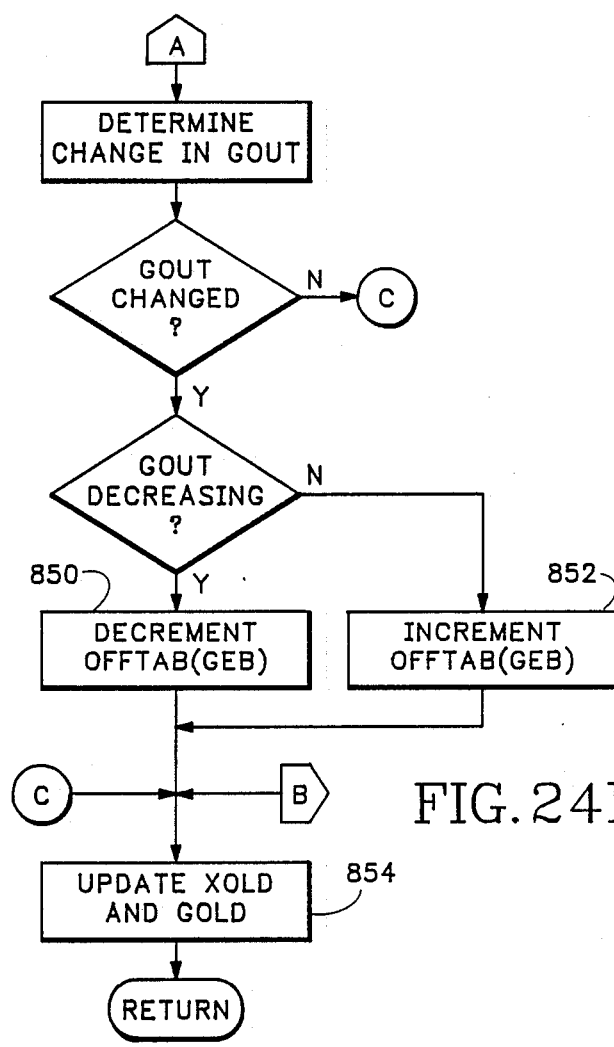

The main processor 116 automatically changes many of the OFFTAB memory registers to maintain proper operation of the metal detector. The metal detector 10 utilizes the routine TRACK 800, to continue to correctly exclude receive signals caused by changing ground mineralization conditions in step 474 of OPR, FIG. 11. The main processor 116 executes TRACK 800 shown in the flow diagram of FIGS. 24A–24B. Four conditions cause the main processor 116 to exit early from the TRACK 800 routine. If the user has disabled tracking, by pressing the GEB ON switch 202, or if the user has moved the trigger switch 122 into the ON position, placing the metal detector into the pinpointing mode, the main processor 116 exits the TRACK routine 800 without adjusting OFFTAB(GEB). The third and fourth conditions for leaving the TRACK routine are related. If an object has been detected and the third bandpass filter 74 is excited, the TRACK routine 800 is exited automatically by the main processor 116 without adjusting OFFTAB(GEB). Each time the main processor 116 detects the bandpass filters 74 in an excited state, it starts a half-second timer count in step 810. If the count is not zero, it is decremented, step 806, and the routine is exited.

If none of the four above-mentioned conditions are present, the main processor 116 converts VALTAB(XD) and GANTAB(XD) to an 8-bit number by using routine BYTE 520 (FIG. 14) and stores it in a table. If there are less than eight entries in the table, the main processor 116 returns to OPR 440, steps 820, 830. Otherwise, the eight entries are averaged, step 832, and the previous average is subtracted from the last calculated average, step 838, resulting in a value XDC. The main processor 116 does not perform the comparison if there is no previous average, steps 814, 834, 836. Channel XD is used for TRACK 800 because its detection axis is nearly 180° out of phase with the driver signal; the XD signal varies inversely with the coil assembly's proximity to the ground. If the average is increasing, that is, XDC is greater than zero, the coil assembly 30 is leaving the ground, and the main processor 116 prepares to exit routine TRACK 800 in step 854. Likewise, if the change is less than a predetermined threshold, preparation is made to exit the routine.

Otherwise, the change in GOUT is calculated. (GOUT was originally calculated in step 568 of DCSTUFF, FIG. 15.) Since the filters are not excited, no target is currently being detected, and any change in GOUT must then be caused by a change in the ground mineralization. Therefore, the main processor 116 increments, step 852, or decrements, step 850, OFFTAB(GEB) to improve the GEB system's exclusion of ground signals. The main processor 116 then stores the current values for the XD average and GOUT and then returns to OPR 440.

The main processor 116 also automatically changes other OFFTAB values. Whenever the trigger switch 122 is toggled, the main processor 116 jumps to the beginning routine OPR 440. In step 442, the main processor 116 calls the routine ADJUST 400, passing the parameters ADO:GD, changing OFFTAB(GD) to null the GD channel A/D reading.

Figure 25:
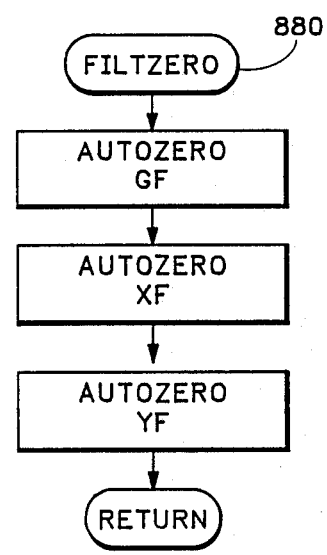
FIG. 25 is a flow diagram of a nulling routine, FILTZERO.

The OFFTAB values for channels XF, YF, and GF are also automatically changed, by the main processor 116 executing the stored program routine FILTZERO, which is executed in step 484 of OPR 440, FIG. 11, and which is shown in the flow diagram of FIG. 25. FILTZERO 880 merely calls the stored program routine AUTOZERO 890, shown in the flow diagram of FIG. 26, for signals XF, YF, and GF. Theoretically, the values stored in OFFTAB(SF), OFFTAB(YF), and OFFTAB(GF) do not need adjusting. However, to compensate for operational amplifier drift, minor adjustments are made.

Figure 26:
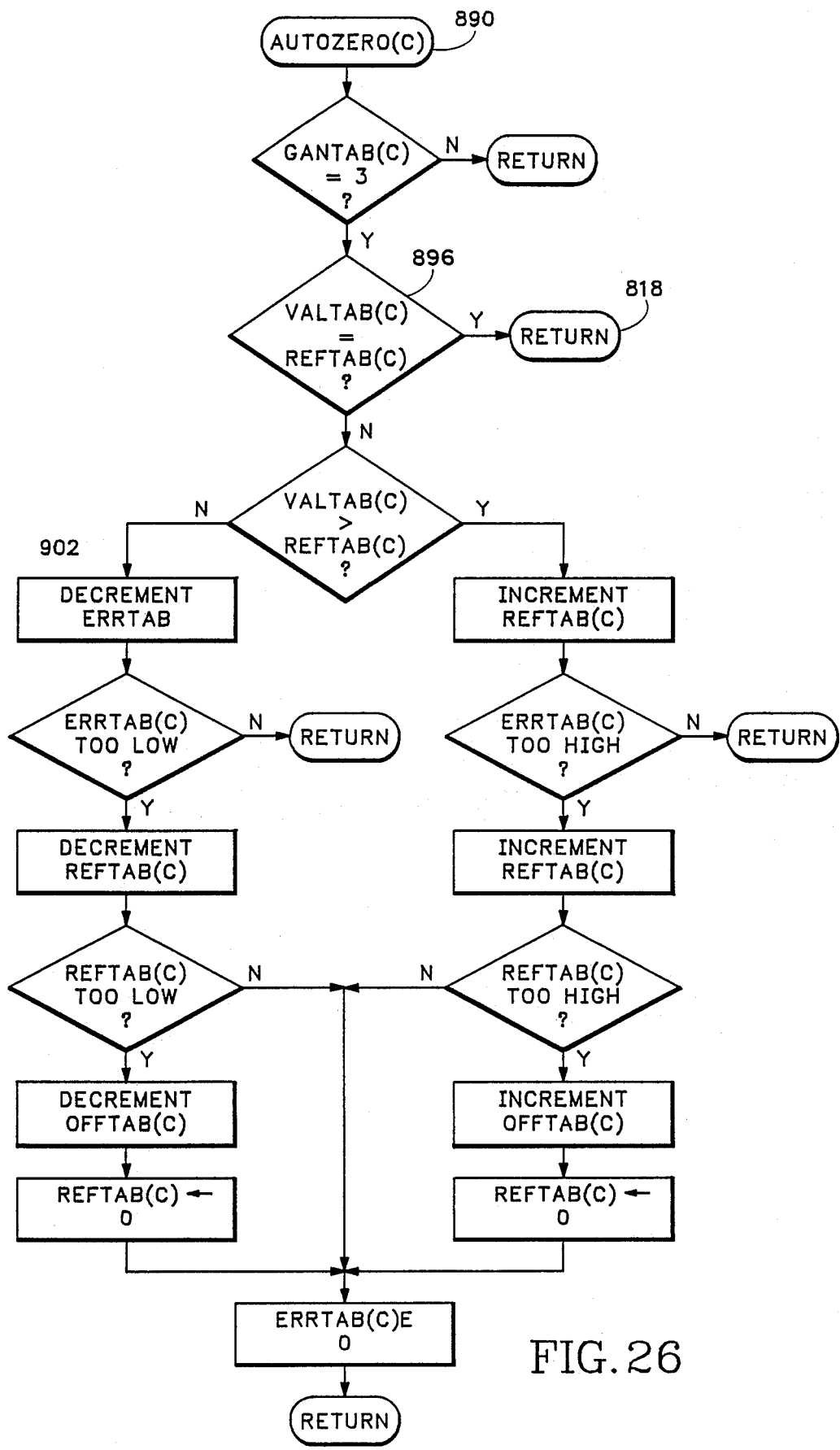
FIG. 26 is a flow diagram of a nulling routine, AUTOZERO.

Referring now to FIG. 26, adjustments are made only if GANTAB(CH) signifies that VALTAB(CH) was read from scaling amplifier 94 where "CH" signifies the channel being "autozeroed." Since this means the maximum gain input of the A/D converter 96 was within range, no target was being detected and the value read should have been zero. If VALTAB(CH) is equal to REFTAB(CH), the internal zero value, then OFFTAB(CH) is correct and the routine is exited, steps 896 and 898. Otherwise adjustment is necessary. VALTAB(CH) may be either too high or too low; therefore two types of adjustment are available. Since these adjustments are merely mirror images of each other, only the adjustment performed when VALTAB(CH) is less than REFTAB(CH) will be discussed. In that case, ERRTAB(CH), which holds an accumulated error count, is decremented by the main processor 116 in step 902. If ERRTAB(CH) is not more negative than a predetermined value, the main processor 116 exits the AUTOZERO 890 routine. Otherwise the main processor 116 also decrements REFTAB(CH) thus decreasing the internal zero value, and ERRTAB(CH) is reset to zero. If REFTAB(CH) is then less than a predetermined value, more adjustment is necessary. The main processor 116 then decrements OFFTAB(CH) by one and REFTAB(CH) is reset to zero. The main processor 116 then exits the AUTOZERO routine 890, returning to the FILTZERO routine 880.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method of discriminating between different types of detected targets while utilizing a metal detector, comprising the steps of:
   (a) producing a periodically varying magnetic field;
   (b) sensing perturbations in said magnetic field;
   (c) producing a periodic receive signal in response to said perturbations, said periodic receive signal having a phase angle corresponding to said perturbations;
   (d) ascertaining said phase angle;
   (e) providing a plurality of memory registers, each one of said memory registers corresponding to a predetermined range of possible phase angles;
   (f) storing within each one of said memory registers a respective datum signifying either an accept or a reject status; and
   (g) producing a user-perceptible signal identifiably corresponding to the datum stored within a particular one of said memory registers corresponding to the range of phase angles which includes said phase angle.

2. A metal detector circuit, comprising:
   (a) signal producing means for producing a periodic signal;
   (b) transmit loop means for receiving said periodic signal and for producing a periodically varying magnetic field;
   (c) receive loop means positioned in said periodically varying magnetic field for sensing perturbations in said periodically varying magnetic field and producing a receive signal having a phase angle in response to sensing said perturbations;
   (d) first phase detector means, responsive to said receive signal and a first phase reference signal, for producing a first analog detection signal corresponding to a first phase angle relationship between said first phase reference signal and said receive signal;
   (e) second phase detector means, responsive to said receive signal and a second phase reference signal, said first phase reference signal being in quadrature with respect to said second phase reference signal, for producing a second analog detection signal corresponding to a second phase angle relationship between said second phase reference signal and said receive signal;
   (f) digitizer means for converting said first and second analog detection signals, respectively, to corresponding first and second digital detection signals;
   (g) a plurality of memory registers, each one of said memory registers corresponding to a range of possible phase angles and having means for containing a respective datum therein signifying alternatively either an accept status or a reject status;
   (h) means for selectively inserting a respective datum into each one of said memory registers;
   (i) digital signal processing means, for calculating said phase angle from said first and second digital detection signals, sensing whether or not one of said memory registers corresponding to a range of possible phase angles which includes said phase angle contains a datum signifying an accept status, and producing a target signal in response to sensing that said memory register does contain a datum which signifies an accept status; and (j) output means for producing a user-perceptible signal in response to said target signal.

3. In a metal detector of the type having a signal producing circuit providing a driver signal and connected to a transmit coil so as to produce a periodically changing magnetic field, and having a receive coil located with respect to said transmit coil so that said periodically changing magnetic field produced by said transmit coil can produce a receive signal having a phase angle in said receive coil, the improvement comprising:

(a) phase angle determining means responsive to said receive signal for determining said phase angle of said receive signal and providing a corresponding phase angle indication as an output therefrom;

(b) a plurality of memory registers, each one of said memory registers corresponding to a respective range of possible phase angles and having means for containing a respective datum therein signifying alternatively either an accept status or a reject status;

(c) means for selecting one of said memory registers, and for selecting a respective datum to be contained therein, and for thereafter inserting said respective datum into said one of said memory registers;

(d) digital signal processing means responsive to said phase angle indication, for identifying a corresponding one of said memory registers which corresponds to a range of possible phase angles which includes said phase angle of said receive signal, and for thereafter identifying a datum contained within said corresponding one of said memory registers; and (e) output means for producing a user-perceptible signal in response to identifying said datum contained within said corresponding one of said memory registers.

4. The metal detector of claim 3 wherein said means for selecting includes a user-operable switch, said respective datum being selected in response to operation of said user-operable switch.

5. The metal detector of claim 3 wherein said means for selecting includes a user-operable register selection switch, said one of said memory registers being selected in response to operation of said user-operable register selection switch.

6. The metal detector of claim 3, wherein said means for selecting is responsive to said digital signal processing means and automatically selects said corresponding one of said memory registers which corresponds to a range of phase angles which includes said phase angle as said one of said memory registers.

7. A method of discriminating among targets while detecting them by use of a metal detector, comprising the steps of:

(a) producing a periodically varying magnetic field, by using a transmit coil;

(b) sensing said periodically varying magnetic field, by using a receive coil located within said periodically varying magnetic field;

(c) producing a periodic receive signal in said receive coil in response to a perturbation in the magnetic coupling between said transmit and receive coils, said periodic receive signal having a receive signal phase angle and a receive signal magnitude, said receive signal phase angle and magnitude corresponding to said perturbation in magnetic coupling;

(d) ascertaining said receive signal magnitude;

(e) ascertaining said receive signal phase angle;

(f) determining whether said receive signal magnitude exceeds a predetermined threshold;

(g) determining whether said receive signal phase angle is within a desired range of possible phase angles;

(h) generating a user-perceptible signal having first and second variable qualities, said first variable quality being present to a first predetermined degree and said second variable quality being present to a second predetermined degree, in response to determining that said receive signal magnitude exceeds said predetermined threshold and that said receive signal phase angle is within said desired range of possible phase angles, while otherwise said first variable quality is present to a degree corresponding to said receive signal magnitude and said second variable quality is present to a degree discernibly different from said second predetermined degree.

8. The method of claim 7 wherein said step of generating comprises producing an audible signal having a variable volume and a variable frequency, said audible signal having a first predetermined volume and a first predetermined frequency in response to determining that said receive signal magnitude exceeds said predetermined threshold and that said receive signal phase angle is within said desired range of possible phase angles, and said audible signal otherwise having a volume corresponding to said receive signal magnitude and having a second predetermined frequency.

9. A method of setting a metal detector circuit to discriminate among targets based on response to a sample target, where said metal detector circuit includes a plurality of memory registers, each one of said memory registers corresponding to a range of possible phase angles, comprising the steps of:

(a) producing a periodically varying magnetic field, by using a transmit coil;

(b) sensing said periodically varying magnetic field, by using a receive coil located within said periodically varying magnetic field and magnetically coupled with said transmit coil;

(c) using said sample target within said periodically varying magnetic field to cause a perturbation in said magnetic coupling;

(d) detecting said perturbation;

(e) producing a periodic receive signal having a phase angle corresponding to said perturbation in said magnetic coupling in response to detecting said perturbation;

(f) determining said phase angle;

(g) identifying one of said plurality of memory registers included in said metal detector which corresponds to a range of phase angles including said phase angle; and (h) inserting a datum into said one of said plurality of memory registers.

10. The method of claim 9 wherein said inserting step comprises inserting an ACCEPT code into said one of said plurality of memory registers.

11. The method of claim 9 wherein said inserting step comprises inserting a REJECT code in said one of said plurality of memory registers.

12. In a metal detector of the type having a signal producing circuit providing a driver signal to a transmit coil so as to produce a periodically changing magnetic field, and having a receive coil located with respect to said transmit coil so that said periodically changing magnetic field produced by said transmit coil can produce a receive signal having a receive signal phase angle and a receive signal magnitude in said receive coil, the improvement comprising:
  (a) magnitude determination means responsive to said receive signal for determining whether said receive signal magnitude exceeds a predetermined threshold;
  (b) discrimination means responsive to said receive signal for producing an ACCEPT signal in response to determining said receive signal phase angle is within a predetermined range of possible phase angles;
  (c) output means, responsive to said magnitude determination means and said discrimination means, for producing a user-perceptible signal having first and second variable qualities, where said first variable quality is present to a first predetermined degree and said second variable quality is present to a second predetermined degree, in response to determining that said receive signal exceeds said predetermined threshold while said discrimination means produces an ACCEPT signal, and where otherwise said first variable quality is present to a degree corresponding to said receive signal magnitude and said second variable quality is present to a degree discernibly different from said second predetermined degree.

13. The metal detector of claim 12 wherein said user-perceptible signal is an audible signal, said first variable quality of said user-perceptible signal is volume, and said second variable quality of said user-perceptible signal is frequency.

14. A method of determining the location of a target by using a metal detector of the type having a transmit coil for generating a magnetic field, a receive coil magnetically coupled with said transmit coil to produce a receive signal in response to a perturbation of said magnetic coupling, and an indicator which produces a user-perceptile output within a limited output range defined by an upper limit and a lower limit, said output being representative of an input to said indicator, comprising the steps of:
  (a) moving said transmit and receive coils near said target causing a perturbation of said magnetic coupling;
  (b) in response to said perturbation, producing in said receive coil a receive signal having a magnitude dependent on the magnitude of said perturbation of said magnetic coupling;
  (c) determining a receive value representative of the magnitude of said receive signal;
  (d) determining the maximum receive value produced;
  (e) calculating an offset value substantially equal to the difference between said maximum receive value and said upper limit of said limited output range;
  (f) thereafter adding said receive value to said offset value, producing a shifted value;
  (g) providing said shifted value to said indicator as an input, such that said indicator produces a user-perceptible output representative of said shifted value; and
  (h) thereafter repeating steps (a) through (g).

* * * * *

UNITED STATES PATENT AND TRADEMARK OFFICE
CERTIFICATE OF CORRECTION

PATENT NO. : 4,868,910

DATED : September 19, 1989

INVENTOR(S) : Richard S. Maulding

It is certified that error appears in the above-identified patent and that said Letters Patent is hereby corrected as shown below:

| | |
|---|---|
| In the Abstract: | Line 13; change "angel" to -- angle -- |
| Col. 1, Line 35: | Change "allgwed" to -- allowed -- |
| Col. 1, Line 41: | Change "otherside" to -- other side -- |
| Col. 13, Line 10: | Change "MXX" to --MUX-- |
| Col. 18, Line 40: | Change "c,f" to -- of -- |
| Col. 21, Line 46: | Change "i" to -- in -- |

Signed and Sealed this

Fourth Day of February, 1992

Attest:

HARRY F. MANBECK, JR.

Attesting Officer     Commissioner of Patents and Trademarks